United States Patent
Diels et al.

(10) Patent No.: US 7,664,149 B2
(45) Date of Patent: Feb. 16, 2010

(54) AUTO-STABILIZATION OF LASERS BY MEANS OF RESONANT STRUCTURES

(75) Inventors: Jean-Claude Diels, Albuquerque, NM (US); Ladan Arissian, Albuquerque, NM (US)

(73) Assignee: STC. UNM, Albuquerque, NM (US)

( * ) Notice: Subject to any disclaimer, the term of this patent is extended or adjusted under 35 U.S.C. 154(b) by 243 days.

(21) Appl. No.: 11/745,837

(22) Filed: May 8, 2007

(65) Prior Publication Data

US 2008/0225907 A1 Sep. 18, 2008

Related U.S. Application Data

(60) Provisional application No. 60/798,471, filed on May 8, 2006.

(51) Int. Cl.
*H01S 3/10* (2006.01)
(52) U.S. Cl. .................... 372/25; 372/29.022
(58) Field of Classification Search ............. 372/25, 372/29.022
See application file for complete search history.

(56) References Cited

U.S. PATENT DOCUMENTS 6,650,682 B1 11/2003 Diels et al.

2004/0213304 A1* 10/2004 Zemmouri et al. ........... 372/32

OTHER PUBLICATIONS

Alipieva, E , et al., "Optic Letters, 28", *Narrow structure in the coherent population trapping resonance in rubidium*, (2003),1817-19.
Alnis, J, et al., "Reverse dark resonance in Rb excited by a diode laser", *J. Phys. B: At. Mol. Opt. Phys*. 34, (2001),3889-3898.
Alzetta, G , et al., "An experimental method for the observation of the RF transitions and laser beat resonances in oriented Na vapour", *N. Cimento*, 36, (1976),5-20.
Arimondo, E , "Coherent population trapping in laser spectroscopy", *Progress in Optics XXXV*, In, E.Wolf (editor),(1996),257-354.
Arissian, Ladan , et al., "Dark line resonance in Rb87 for auto-stabilization of the repletion rate", *CLEO 2006/2005; copyright: Optical Society of America*, 3 pgs.
Arissian, Ladan , et al., "Four photon coherent interaction applied to long term stabilization of a femtosecond clock", *In CLEO 2002, Fol QTuB3*, Long Beach CA, (2002),54.
Arissian, L , et al., "Mode-locked laser as a combined radio-frequency and optical clock, stabilized to a reference cavity, and calibrated through coherent interaction with rubidium",*In Applications of Photonic Technology 6*, vol. 5260-82, (2003),217-225.
Arissian, L , et al., "Multiple quantum wells for ring and linear lasers with long lifetime gain", *In Solid State Lasers, X*, vol. 5707-52, (2002),295-301.

(Continued)

*Primary Examiner*—Dung T Nguyen
(74) *Attorney, Agent, or Firm*—Schwegman, Lundberg & Woessner, P.A.

(57) ABSTRACT

Apparatus, systems, and methods are provided that utilize a material inserted into a laser cavity such that the material has an optical length that varies as the laser cavity varies to keep the repetition rate constant. The material may provide auto-stabilization of the optical output form the laser cavity.

22 Claims, 15 Drawing Sheets

OTHER PUBLICATIONS

Arissian, L, et al., "Progress towards a high-precision frequency comb with mode-locked lasers, and sensor applications", *Laser Resonators and Beam Control VI*. Edited by Kudryashov, Alexis V.; Paxton, Alan H., *Proceedings of the SPIE*, vol. 4969Publication Date: Jun. 2003, 1-10.

Arissian, L , "Stabilization of mode-locked lasers, and dark resonance of two-photon lambda-level structures", *Journal of Modern Optics*, 49, (2002),2517-2533.

Arissian, L , et al., "Use of Rb transitions to lock both the wavelength and repetition rate of a mode locked laser", *In Optical Society of America*, editor, *CLEO 2003*, Baltimore, (2003),1-2.

Ashihara, S , et al., "Group-velocity matched second-harmonic generation in tilted quasi-phase-matched gratings", *J. Opt. Soc. Am. B*, 20, (2003),853-56.

Baozhen, Z , et al., "Investigation of noncollinear QPM optical parametric amplification based on periodically poled KTP", *Optics Communications*, 248(4-6), (Apr. 2005),387-94.

Biegert, J , et al., "Compression of pulses of a few optical cycles through harmonic conversion", *Journal of Optical Society B*, 18, (2001),1218-26.

Biegert, J , et al., "Feasibility study to create a polychromatic guidestar in atomic sodium", *Physical Review, A*, 67, (2003),11 pgs.

Bohn, Matthew J., et al., "Measuring intracavity phase changes using double pulses in a linear cavity", *Optics Letters*, 22, (1997),642-44.

Bohn, M , et al., "Optimizing the Frequency of a Null-Bias Dithered Laser Gyroscope", *Optics Communications*, 213, (Dec. 2002),331-7.

Bouchiat, M , "Relaxation of Optically Pumped Rb Atoms on Paraffin-Coated Walls", *Phys. Rev. 147*, Issue 1, (Jul. 1996),41-54.

Brandt, S , et al., "Buffer-gas-induced linewidth reduction of coherent dark resonances to below 50 Hz", *Phys. Rev. A 56*, Issue 2, (Aug. 1997),R1063-R1066.

Brattke, S , "Coherent dark states of rubidium 87 in a buffer gas using pulsed laser light", *The European Physical Journal D—Atomic, Molecular, Optical and Plasma Physics*, vol. 3, No. 2, (Aug. 1998),159-61.

Cohen-Tannoudji, C , et al., "Quantum Mechanics", *John Wiley and Sons*, New York, (1977),12 pgs.

Crenshaw, M, et al., "Laser Propagation in Atomic Vapors", *Science and Engineering on Cray Supercomputers, Proceedings of the Third International Symposium*, Minneapolis, Minnesota, Sep. 1987. Organized by Cray Research, Inc., (1997),477-90.

Cyr, N, et al., "All-Optical Microwave Frequency Standard: A Proposal", *Instrumentation and Measurement, IEEE Transactions on* vol. 42, Issue 2, (Apr. 1993),640-649.

Diddams, Scott , et al., "Differential intracavity phase spectroscopy of a three-level system in samarium", *Phys Rev A*, 58, (1998),2252-64.

Diddams, Scott , et al., "Frequency locking and unlocking in a femtosecond ring laser with the application to intracavity phase measurements", *Applied Physics B*, 63, (1996),473-80.

Diels, J , et al., "Applications to sensors of extreme sensitivity", In Jun Ye and Steven Cundiff (editors), Femtosecond Optical Frequency Comb.: Principle Operation and Applications, Chapter 3, Springer, NY,(2005),333-54.

Diels, J, et al., "Femtosecond pulses and laser resonators", *In Laser resonators and beam control VIII*, vol. 5708-40. SPIE., (2005),54-62.

Diels, J , et al., "Stabilized frequency combs to metrology", *In Proceedings of the International Conference on Coherent and Nonlinear Optics, and on Lasers, Applications and Technologies (ICONO/LAT 2005)*, (2005),1 pg.

Diels, J C., et al., "Sensors of rotation, displacement, index of refraction, magnetic field, electric field and magnetic susceptibility", *UNM-490—provisional application*, 13 pgs.

Diels, J C., et al., "Ultrashort laser pulse phenomena (book)", *Academic Press Inc*, ISBN: 0-12-215493-2 ISBN 13: 978-0-12-215493-5,9 pgs.

Edelstein D, C , et al., "Broadly tunable high repetition rate femtosecond optical parametric oscillator", *Appl Phys Lett*, 54, (1989),1728-30.

Erhard, M , et al., "Power broadening and Doppler effects of coherent dark resonances in Rb", *Phys. Rev. A 62*, Issue 6, (Nov. 2000),4 pgs.

Fleischhauer, M , et al., "Resonantly enhanced refractive index without absorption via atomic coherence", *Phys Rev A*, 46, (1992),1468-87.

Hall, J , et al., "Optical frequency standards and measurement", *Instrumentation and Measurement, IEEE Transactions* on vol. 52, Issue 2, (Apr. 2003),227-231.

Holman, Kevin W., et al., "Orthogonal control of the frequency comb dynamics of a mode locked laser diode", *Optical Letters*, 28(23), (2003),2405-7.

Hsu, C W., et al., "Broadband infrared generation with noncollinear optical parametric processes on periodically poled $LiNbO_3$", *Optic Letters*, Optics Letters, vol. 26, Issue 18,(2001),1412-1414.

Jamasbi, N , et al., "A femtosecond optical technique to study ultrafast oscillating systems in real time",*J. Opt. 27*, (1996),105-109.

Jelinkova, H , "All solid state picosecond flashlamp pumped oscillator amplifier nd: YAG laser system", In Jarmila Kodymova, ed, *Book of Abstracts of XV International Symposium on Gas Flow and Chemical Lasers and High Power Laser Conference, GCL/HPL*, vol. 5777, (2005),373-377.

Jones, R J., et al., "Stabilization of the frequency, phase and repetition rate of an ultra-short pulse train to a Fabry-Pero reference cavity", *Optics Comm*, 175, (2000),409-18.

Knappe, "Characterization of coherent population-trapping resonances as atomic frequency references", *Journal of the Optical Society of America*, B(18)vol. 18, Issue 11, (2001),1545-1553.

Kubacek, V, et al., "Ultralow-pump-threshold laser diode pumped Cr: LiSAF laser", *International Conference on Lasers, Applications, and Technologies 2002: Advanced Lasers and Systems*. Edited by Huber, Guenter; Scherbakov, Ivan A.; Panchenko, Vladislav Y. *Proceedings of the SPIE*, vol. 5137, (2003),43-47.

Kubecek, V , et al., "Bidirectional operation of a ring diode pumped mode locked Nd YVO4 laser", In Clifford R Pollock Alphan Sennaroglu, James G. Fujimoto, eds, *Solid State Lasers and Amplifiers* vol. 5460, (2004),309-14.

Kubecek, V , et al., "Comparison of passively mode-locked operation of diode pumped Nd:YAG laser using either second harmonic nonlinear mirror or semiconductor saturable absorber", *Proceedings of SPIE*—vol. 5707, Solid State Lasers XIV: Technology and Devices, Hanna J. Hoffman, Ramesh K. Shori, Editors,(2005),287-294.

Kubecek, V , et al., "Flashlamp pumped oscillator-amplifier Nd:YAG system mode-locked using multiple quantum well saturable absorber", In Clifford R. Pollock Alphan Sennaroglu, et al (editors), *Solid State Lasers and Amplifiers*, vol. 5460, (Sep. 2004),110-114.

Kubecek, V, et al., "Mode-locked Nd:YAG laser with passive negative feedback using multiple quantum well saturable absorber", *In proceedings of SPIE: GC:HPL*, (2004),757-61.

Kubecek, V , et al., "Multiple quantum wells for mode locking", *In Lasers and Electro-Optics, (CLEO)* vol. 2, Issue , May 16-21, 2004,3 pages.

Lapidus, L , *Numerical Solution of Ordinary Differential Equations*, Table of Contents, Academic Press Inc., U.S.,(Mar. 1971),5 pgs.

Lofthus, T, "Magnetic trapping of ytterbium and the alkaline earths", *Technical Digest. Summaries of Papers Presented at the Quantum Electronics and Laser Science Conference*, 2001, 265-266.

Lukin, M D., et al., "Spectroscopy in Dense Coherent Media: Line Narrowing and Interference Effects", *Phys Rev Lett.* 79, (1997),2959-62.

Marburger, J H., et al., "Theory of a lossless nonlinear Fabry-Perot interferometer", *Phys. Rev. A 17*, Issue 1, (Jan. 1978),335-342.

Meng, X , et al., "Femtosecond intracavity pumped ring optical parametric oscillator: An ultra-sensitive sensor", *Conference on Lasers and Electro-Optics, (CLEO)*, vol. 1 May 16-21, 2004,2 pgs.

Meng, Xianmei, et al., "Intracavity pumped optical parametric oscillator bidirectional ring laser as a differential interferometer", *Optics Communications*, vol. 233, Issue 1-3, (2004), 167-172.

Meng, Xianmei, et al., "Nanometer sensitivity of a femtosecond optical parametric ring oscillator", *Conference on Lasers and Electro-Optics, 2003. CLEO 1-6* On page(s): 2 pp.-, (Jun. 2003),2 pgs.

Meng, X , "Ultrashort pulse OPO ring laser", *In CLEO 2000, technical digest*, vol. CMW7 *Lasers and Electro-Optics Conference*, (2000),122.

Merimaa, M., et al., "All-optical atomic clock based on coherent population trapping in 85Rb", *Optical Society of America Journal B*, vol. 20, Issue 2, (2003),273-279.

Mlynek, J., et al., "High resolution coherence spectroscopy using pulse trains", *Phys Rev A*, 24, (1981),1099-1102.

Quintero-Torres, et al., "Bi-directional ring laser as a scatterometer", *Conference on Lasers and Electro-Optics, 2003. CLEO. Technical Digest. Optical Society of America*, (2003),930-31.

Quintero-Torres, et al., "High-sensitivity scatterometer with a bidirectional ring laser", In Alexis V. Kudryashov and Alan H. Paxton, editors, *Laser resonators and Beam Control*, VI, vol. 4969, (2003),271-75.

Quintero-Torres, R., et al., "Multiple quantum wells for passive ultra short laser pulse generation", *Physica Status Solidi (c)* vol. 2, Issue 8, (2005),3015-3018.

Quintero-Torres, R., "Scatterometer using a bidirectional ring laser", *Optics Communications*, vol. 241, Issue 1-3, (Nov. 2004),179-183.

Sautenkov, V A., "Enhancement of magneto-optic effects via large atomic coherence in optically dense media", *Phys. Rev. A 62*, Issue 2, (Jul. 2000),4 pgs.

Schmidt, O., et al., "Steep dispersion and group velocity below c/3000 in coherent population trapping", *Phys. Rev. A 53*, Issue 1, (Jan. 1996),R27-R30.

Stahller, M, "Coherent Population Trapping Resonance in a Thermal 85Rb vapor: D1 versus D2 line excitation", *Opt. Lett.*, 27, (2002),1472-1474.

Wachman, D C., et al., "Continuous-wave mode-locked and dispersion-compensated femtosecond", *Opt. Lett.*, 15, (1990),136-138.

\* cited by examiner (a)

AUTO-STABILIZATION OF LASERS BY MEANS OF RESONANT STRUCTURES

RELATED APPLICATION

This application claims priority under 35 U.S.C. 119(e) from U.S. Provisional Application Ser. No. 60/798,471 filed 8 May 2006, which application is incorporated herein by reference.

GOVERNMENT INTEREST STATEMENT

This invention was made with Government support through Subaward no. 31607 awarded by the MURI/University of Colorado at Boulder under the U.S. Office of Naval Research prime grant no. N00014-02-1-0714. The Government has certain rights in the invention.

FIELD OF THE INVENTION

This invention relates generally to lasers and stabilization of lasers in particular.

BACKGROUND

Coherent population trapping, first observed in sodium atoms, is a manifestation of laser interaction with a three level system, where a coherence between two hyperfine ground state levels is achieved through a two photon process. In a three-level lambda (Λ) system, a particular laser excitation can provide a resonance condition in which destructive interference occurs between excitation pathways. The population is reduced in the upper state and trapped within the two ground states, creating a "dark state." This reduction of fluorescence and absorption has been given the name "dark line."

The transition between ground states of an alkali metal is electric dipole forbidden and has a long lifetime. The narrow resonance feature of this effect has stimulated the idea of an all-optical frequency standard. Introducing a buffer gas in a cell as well as using a cell with Paraffin-coated walls can reduce the linewidth. The dependence of the width and contrast of this narrow line on the laser power, the light polarization, the magnetic field, and the cell temperature of rubidium has been studied. In those experiments, a pair of phase locked lasers or a single laser source modulated by half of the ground-state hyperfine splitting has been used to create coherence between hyperfine split ground state levels. The coherence effect using a pulse train by adjusting its repetition rate to a submultiple of the hyperfine splitting of sodium has been observed. Pulse generation by current modulation of a laser diode has been used. Further advances in laser systems and laser spectroscopy are needed.

BRIEF DESCRIPTION OF THE FIGURES

Embodiments of the invention are illustrated by way of example and not limitation in the figures of the accompanying drawings in which.

DESCRIPTION

The following detailed description refers to the accompanying drawings that show, by way of illustration, various example embodiments. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 1:
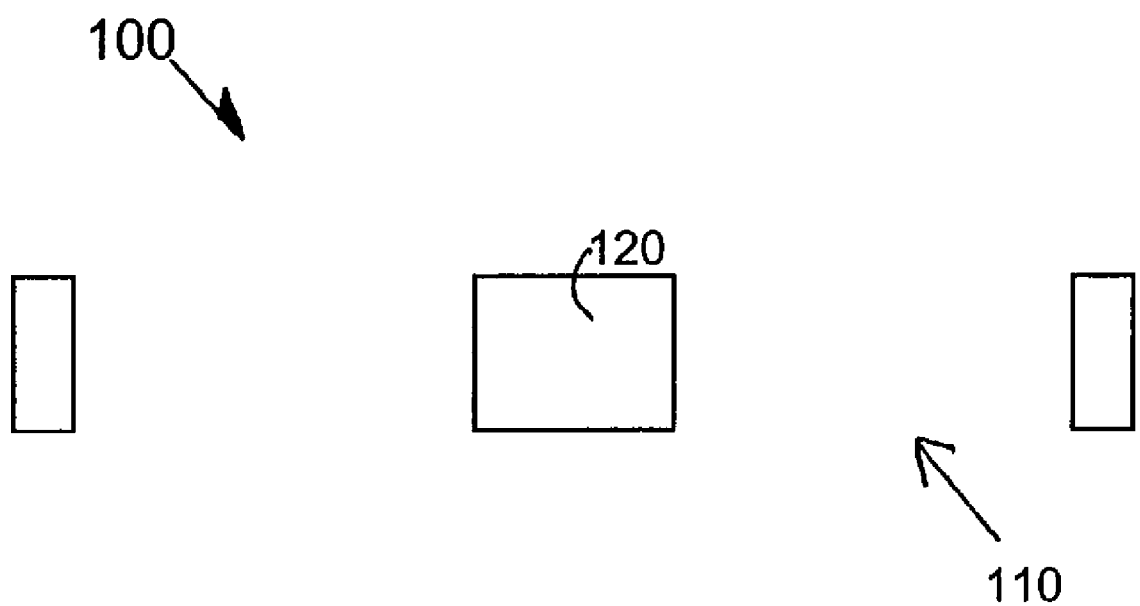
FIG. 1 illustrates an embodiment of an apparatus having a laser cavity and a material disposed in the laser cavity, where the structure of the material provides a mechanism to adjust the optical length of laser cavity as a repetition rate of an optical output of the laser cavity varies.

FIG. 1 illustrates an embodiment of an apparatus 100 having a laser cavity 110 and a material 120 disposed in laser cavity 110, where the structure of material 120 provides a mechanism to adjust the optical length of laser cavity 110 to maintain a constant repetition rate as cavity length fluctuates.

In such a configuration, material 120 is material different from the gain medium of the laser cavity. In an embodiment, the optical length, through a change in index of refraction due to material 120, decreases as the repetition rate of the laser output of laser cavity 110 decreases. Random changes in the cavity length of mode-locked lasers cause the repetition rate to fluctuate. For instance, as the cavity length increases, the repetition rate decreases. Embodiments include inserting inside the laser a material of which the optical length (through the index of refraction) decreases as the repetition rate decreases. As a result of the material in the laser cavity, the two effects can compensate, eliminating the fluctuations in repetition rate. The material may be structured with a resonant atomic transition proportional to the repetition rate. The material may have a structure having at least a three levels to provide resonant coherent interaction. In an embodiment, material 120 may be atomic vapors in which intracavity interaction provides stabilization of the source. Such insertion of atomic vapors in cavities may provide self-stabilization, without the use of electronics. Among various applications, such lasers may be used as ultra-accurate time standards.

Figure 2A:
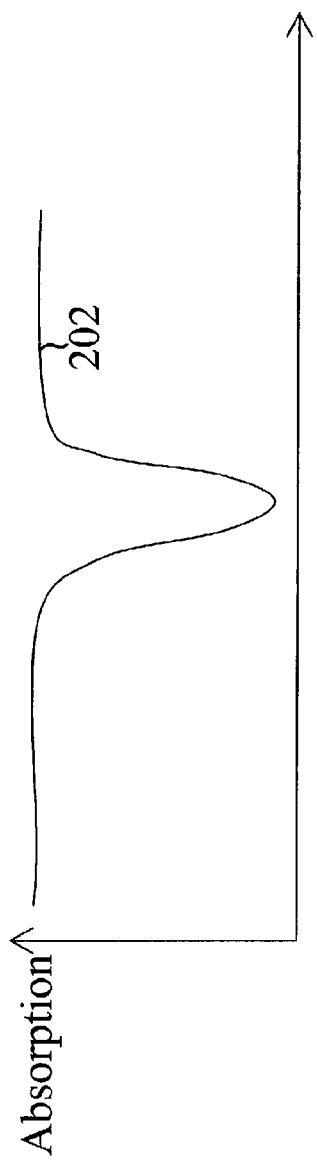
FIGS. 2A-E demonstrate the relationship of the properties for selection of a material to be used in a laser cavity to provide auto-stabilization to the output from the laser cavity.
Figure 2B:
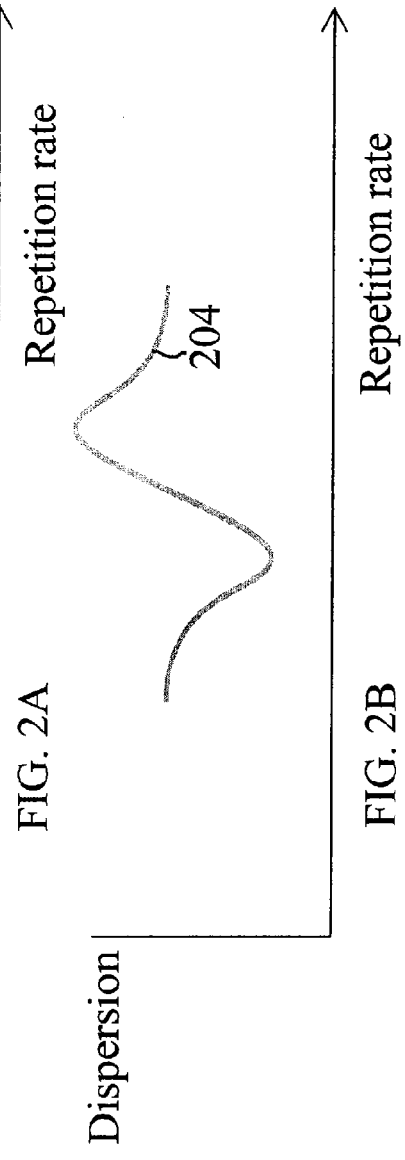
Figure 2C:
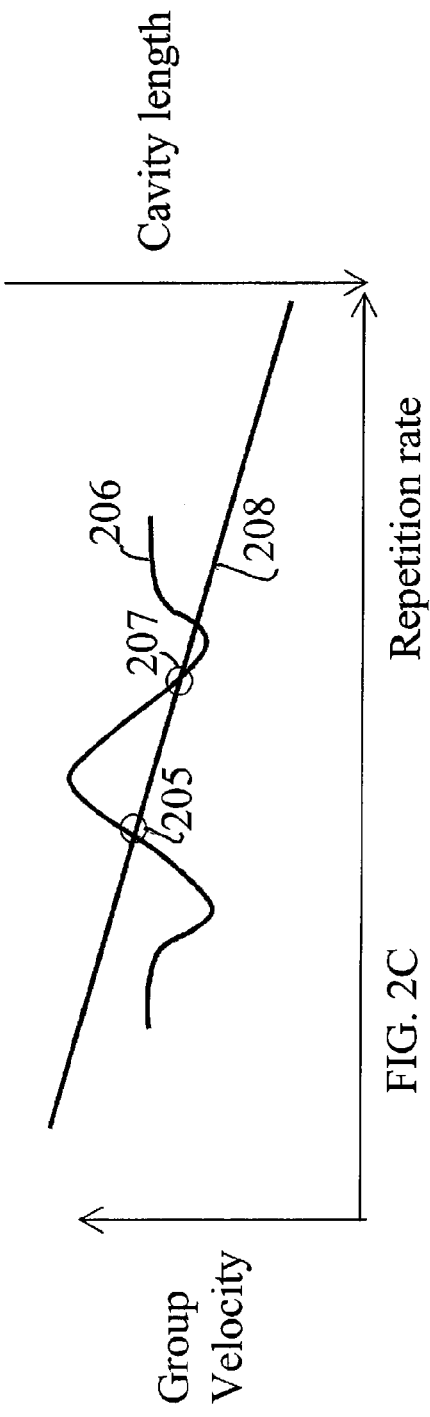
Figure 2D:
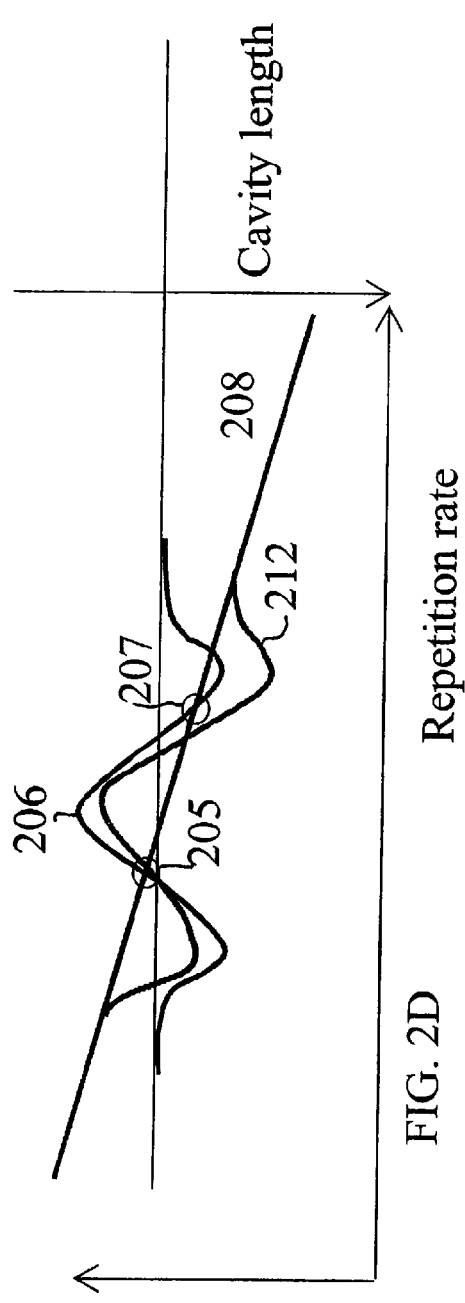
Figure 2E:
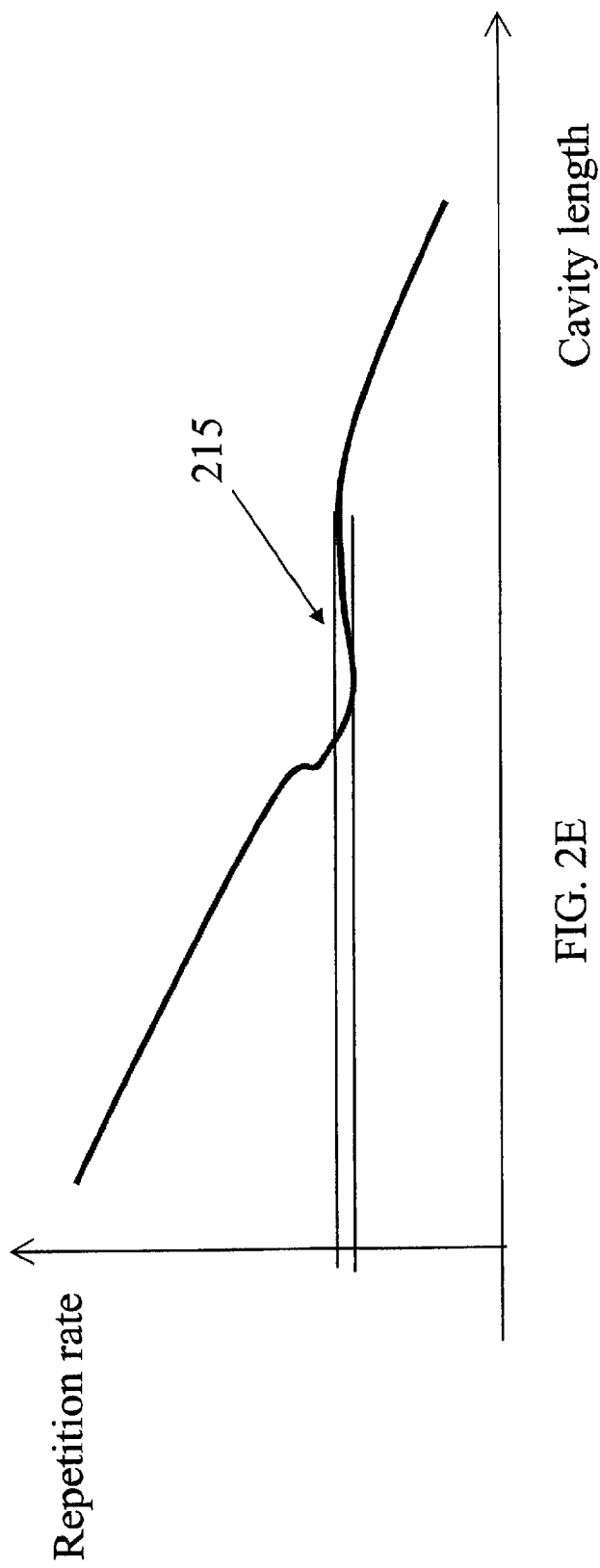

FIGS. 2A-E demonstrate the relationship of the properties for selection of a material to be used in a laser cavity to provide auto-stabilization to the output from the laser cavity. FIG. 2A shows the absorption 202 of a material. FIG. 2B shows the dispersion 204 of the material. FIG. 2C shows the group velocity 206 and cavity length 208 for the laser cavity as a function of repetition rate of the optical output from the laser cavity. Point 205 represents a stable point of operation, while 207 represents an unstable point. FIG. 2E shows the response of the system that is the sum 212 of the response from combination of the group velocity 206 and cavity length 208. FIG. 2E shows a plot of repetition rate versus cavity length, taking into account that the repetition rate also changes the group velocity, which in turn changes the repetition rate. Stable region 215 is substantially independent of cavity length fluctuations.

In an embodiment, rubidium may be used as a material inserted in a laser cavity of a mode-locked laser for auto-stabilization of the repetition rate of the laser. In an embodiment, rubidium may be included in a laser cavity in the amount of about $10^{20}$ atoms/m$^3$. Such materials are not limited to rubidium. The following examines dark line resonance in $^{87}$Rb.

Spectroscopy of a Λ structure in $^{87}$Rb can be performed with a mode locked laser. A dark line, resulting from population trapping between the hyperfine levels, is observed when the repetition rate is a submultiple of the hyperfine splitting, such as 1/57th of the hyperfine splitting. The pulse bandwidth (inverse of the pulse duration) is chosen to be much broader than the 6.847 GHz splitting of the ground state. Therefore, the series of modes within the Doppler profile contribute to transitions from the $5S_{1/2}$, F=1, to the $5P_{1/2}$ to the $5S_{1/2}$ levels. Calculations and measurements of the excitation of rubidium excited by an infinite train of pulses, as the repetition rate (or the period of the pulse train) is being varied can be conducted. The calculations can be carried out in the time domain, integrating the system of differential equations for the density matrix of the three levels (two ground states 1 and 2, and an excited state 3) for a time sufficient to reach steady state (more than 400 pulses), for various values of the pulse period. The fluorescence of the excited rubidium will be proportional to the diagonal matrix element $p_{33}$, while the dispersion/absorption are given by the real and imaginary parts of the off-diagonal elements $\sigma_{31}$ and $\sigma_{32}$. The relevant density matrix equations are $$\frac{dp_{33}}{dt} = \frac{p_{31}}{2\hbar}\text{Im}(\tilde{\varepsilon}\sigma_{31}^*) + \frac{p_{32}}{i2\hbar}\text{Im}(\tilde{\varepsilon}\sigma_{32}^*) + -\Gamma_3 p_{33} \quad (1)$$

$$\frac{d\sigma_{3j}}{dt} = i(\omega_3 - \omega_1 - \omega)\sigma_{3j} - \frac{ip_{3k}\tilde{\varepsilon}}{\hbar}(p_{33} - p_{11}) + i\frac{p_{3k}\tilde{\varepsilon}}{\hbar}p_{2j} - \Gamma_{3j}\sigma_{3j} \quad (2)$$

where in the last equation the symbols j, k are 1, 2.

Figure 3A:
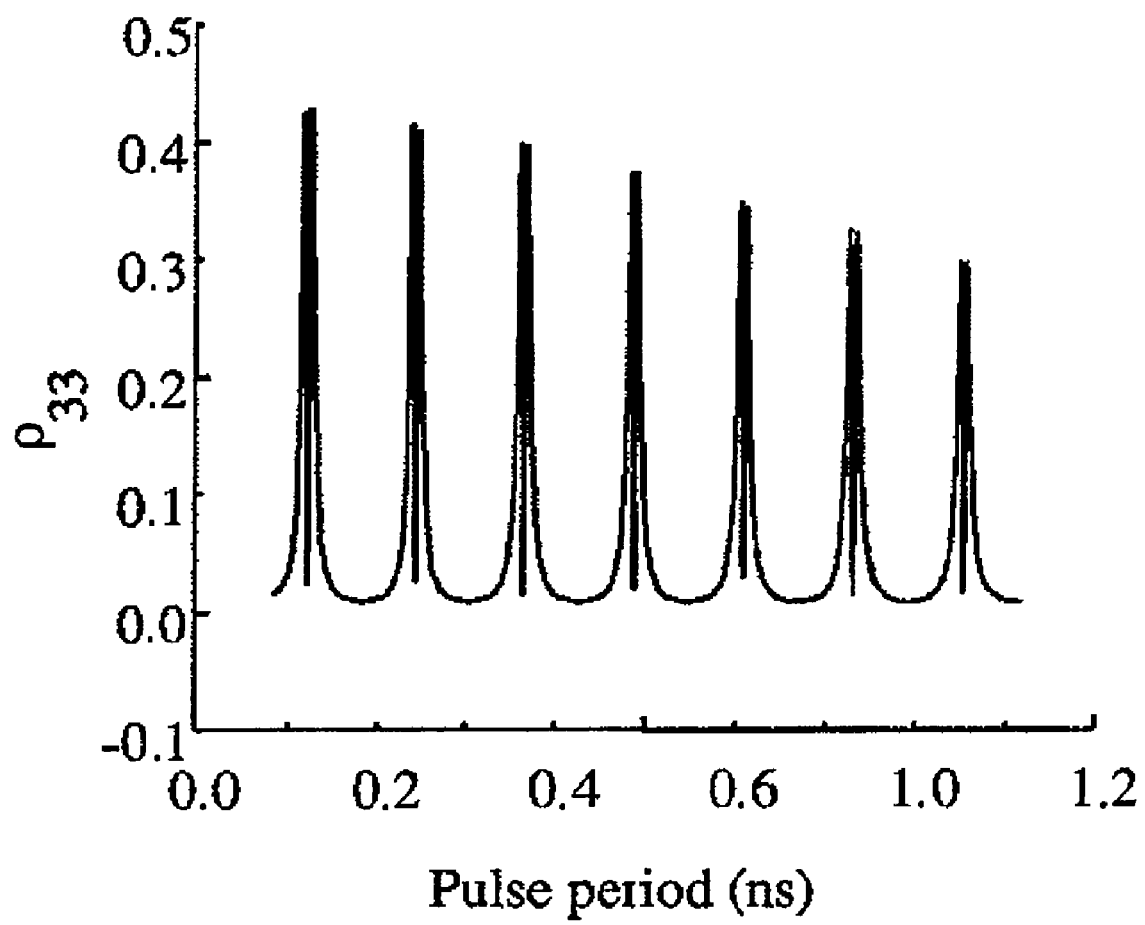
FIGS. 3A-3C show values of the steady state reached by some matrix elements as a function of the pulse period.
Figure 3B:
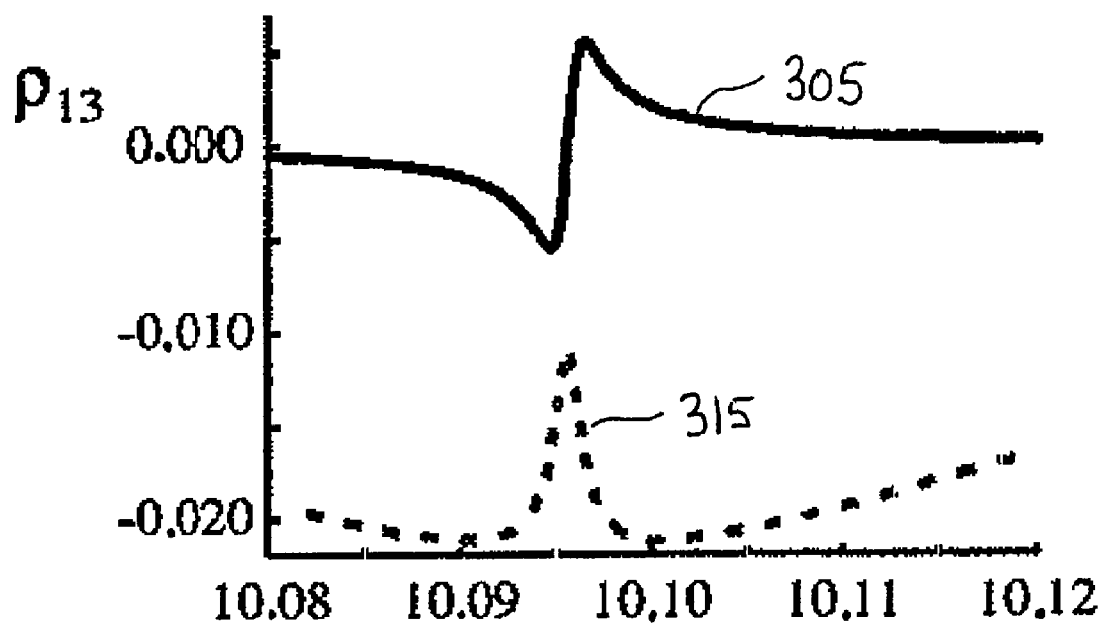
Figure 3C:
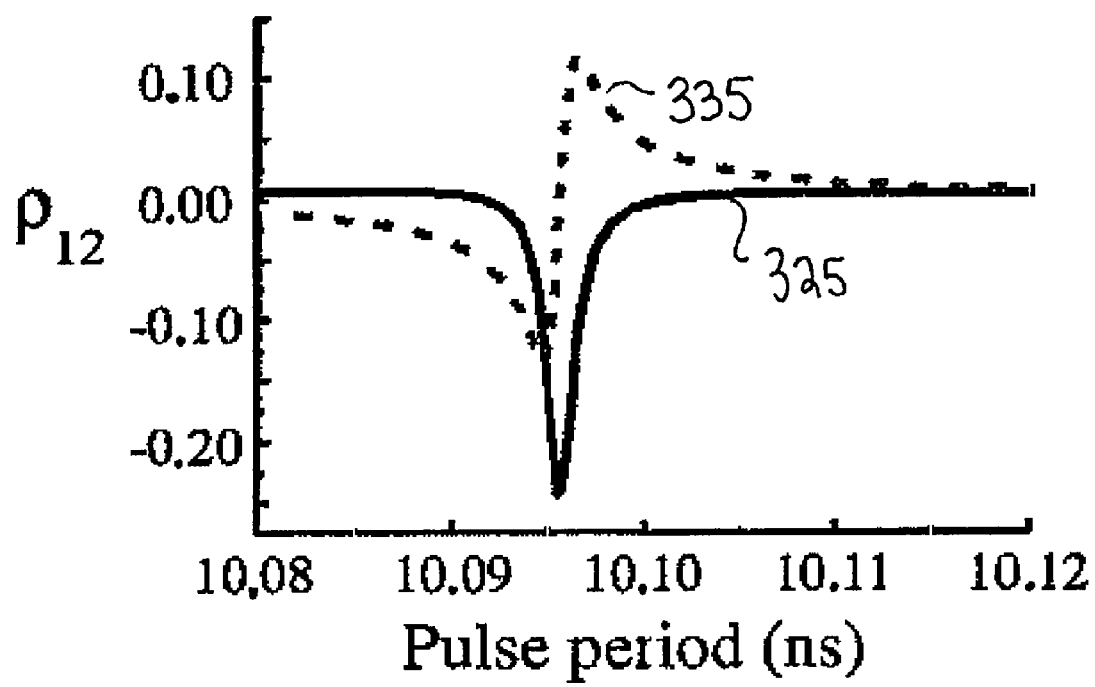

FIGS. 3A-3C show values of the steady state reached by some matrix elements as a function of the pulse period. It is seen that the absorption and fluorescence have periodic resonance features, including an increase in the vicinity of resonance, and a narrow dip near resonance. FIG. 3A shows successive resonances seen in the population number of the upper state, as the repetition rate passes through successive sub-multiples of the ground-state hyperfine splitting. FIG. 3B shows the real 305 and imaginary 315 parts of $p_{13}$ for the 59$^{th}$ submultiple. FIG. 3C shows the real 325 and imaginary 335 parts of $p_{12}$ for the 59$^{th}$ submultiple.

Figure 4:
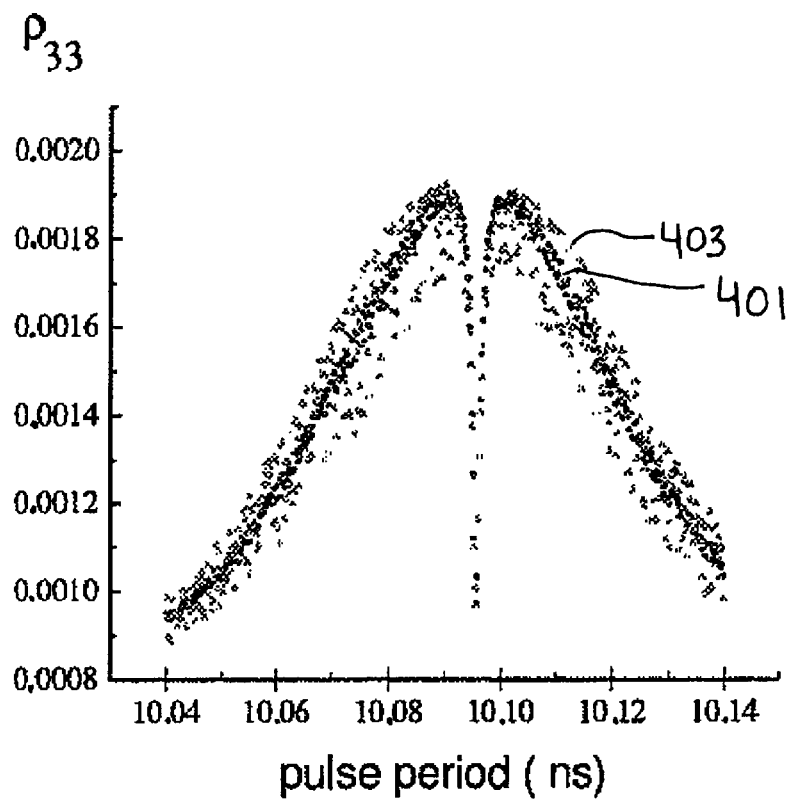
FIG. 4 illustrates an insensitivity to random fluctuations in the mode frequency.

The resonance curve was studied for various values of the carrier frequency. It was seen that the dark line is remarkably insensitive to the exact value of the mode frequency. FIG. 4 illustrates this remarkable insensitivity to random fluctuations in the mode frequency. The carrier frequency was given sudden random jump 401 in the interval ±2 MHz (the inter points shown) or random jump 403 in the interval ±10 MHz (the outer points shown). It is seen that the width and position of the dark resonance is not affected.

Figure 5:
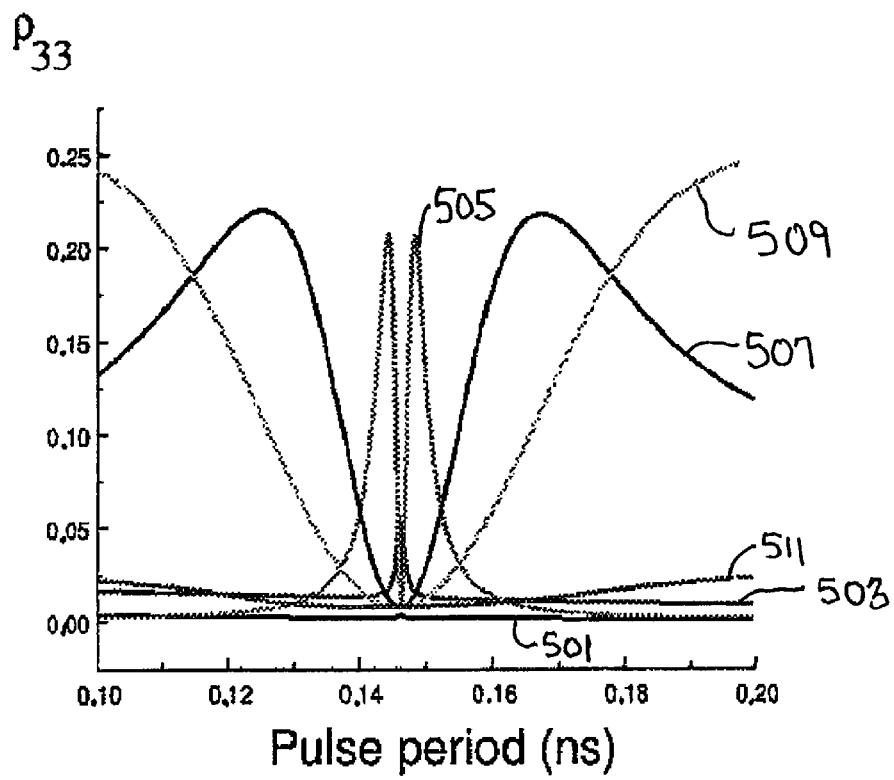
FIG. 5 shows dark line resonances computed for various values of the pulse area.

FIG. 5 shows dark line resonances computed for various values of the pulse area. The pulse area is also a parameter to consider. The pulse areas shown in FIG. 5 are area 501 of 0.001, area 503 of 0.005, area 505 of 0.05, area 507 of 0.5, area 509 of 1, and area 511 of 2. At low pulse areas, the contrast of the dark resonance increases to its maximum value at an area of approximately 0.05. The width of the dark line subsequently increases with increasing area.

Figure 6:
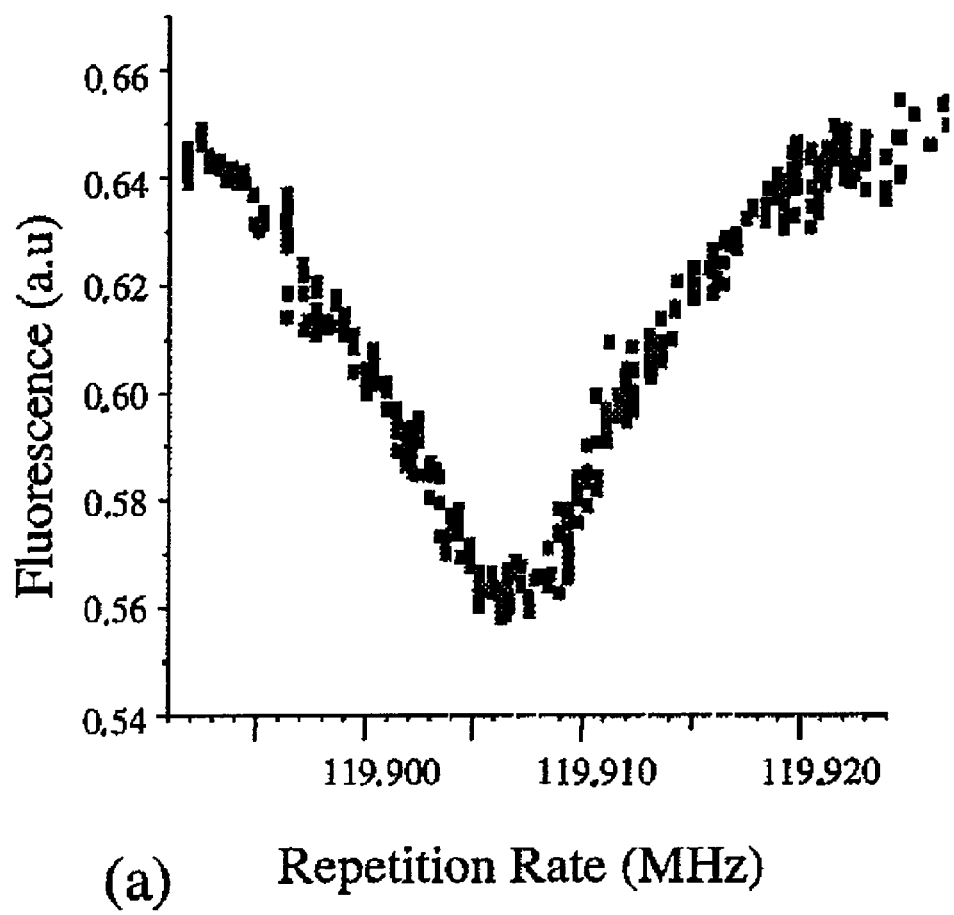
FIG. 6 shows an experimental recording of the dark line resonance of rubidium obtained by scanning the repetition rate of a Ti:sapphire laser near the $57^{th}$ submultiple of the hyperfine splitting of the ground state.

Such a spectroscopic arrangement provides a coherent interaction of a single photon transition in rubidium by a pulse train from a Ti-sapphire mode-locked laser. A 4.6 mm birefringent filter in the cavity can set the pulse duration to 1 ps and allow for some tunability of the pulse spectrum around 795 nm. An experiment can be carried out with the Ti:sapphire laser with output mirror placed on a translation stage driven by a slow (≈2 minutes/turn) synchronous motor. The laser can be mode-locked around 795 nm by a multiple quantum well (MQW) of composition selected for the desired wavelength. To prevent effects due to two photon resonances, the birefringent filter can prevent the generation of pulses shorter than 1 ps. The side fluorescence of a rubidium cell can be monitored with a photomultiplier, as the cavity length is being scanned. FIG. 6 shows an experimental recording of the dark line resonance of rubidium obtained by scanning the repetition rate of Ti:sapphire laser near the 57$^{th}$ submultiple of the hyperfine splitting of the ground state. The cell did not contain any buffer gas, and the 15 kHz linewidth corresponds to the transit time broadening of the 2.3 mm wide beam.

Figure 7:
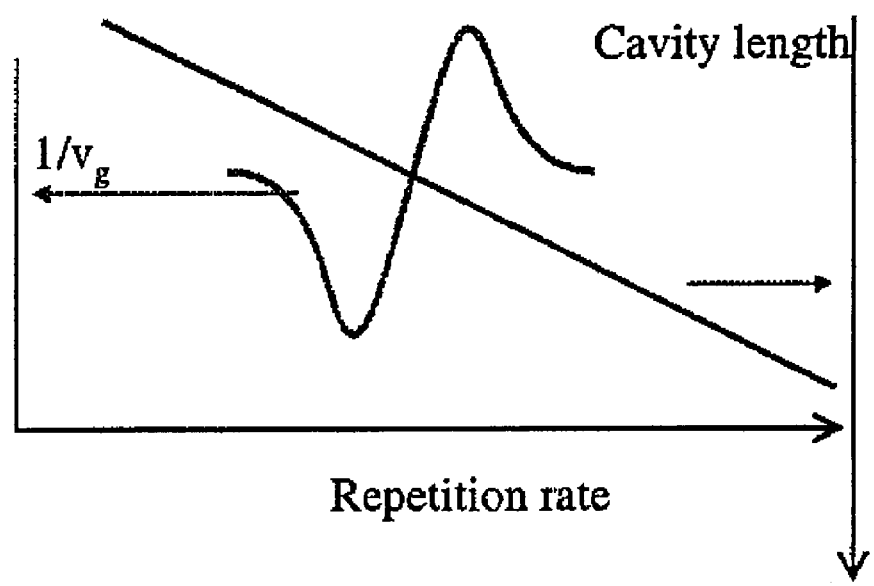
FIG. 7 illustrates a principle of self-stabilization.

FIG. 7 illustrates a principle of self-stabilization. To the dip in fluorescence corresponds also a dip in absorption, which will have the corresponding dispersion typical of a gain line, as sketched in FIG. 7. Consider a rubidium cell inserted in a unidirectional mode-locked ring cavity. Cavity length fluctuations will cause fluctuations in repetition rate. For instance, a decrease in cavity length will cause the repetition rate to increase. But an increase in repetition rate, in view of the dispersion of the dark resonance, will result in an increase in group delay of the pulse. This increase in group delay in turn produces a decrease in repetition rate, hence a stabilization of the laser without the need for electronic feedback. Such a type of stabilization may be applied to the pump cavity of an intracavity pumped optical parametric oscillator. In such a laser, the repetition rate of the signal may be uniquely determined by the pump cavity length, which does not affect the signal wavelength or signal mode frequency.

Dark resonance spectroscopy can be conducted essentially without a need to control the random mode frequency fluctuations by scanning solely the repetition rate of the laser. In various embodiments, systems with laser apparatus can be constructed with the laser apparatus stabilized essentially without electronics.

A picosecond laser mode-locked by a multiple quantum well saturable absorber may be used to establish coherence between the two $5S_{1/2}$ hyperfine levels of $^{87}$Rb. The spectrum of the picosecond pulse covers both optical transitions from the split ground states to the level $5P_{1/2}$, keeping each branch of the $\Lambda$ transition on resonance. The population is trapped between the ground states, when the repetition rate of the pulse train is a sub-multiple of hyperfine splitting.

It can be shown experimentally and theoretically that the coherence population trapping is insensitive to substantially the exact optical resonance condition. Hence, there is no need for phase stabilization. The dark line effect had been suggested as a source for atomic clock in the absence of magnetic field and as a tool for magnetometry in presence of a magnetic field splitting the levels into Zeeman components. In an embodiment, a continuous pulse train provides a source for a variety of applications involving coherence population trapping, since the optical modes are from a single laser source. In such embodiments, there is essentially no need for electronic stabilization.

Studies of coherent population trapping lead either to the observation of a dark line or a reverse bright line. These studies were based on single mode lasers. Experimental and theoretical studies of coherence interaction between a pulse train and a three level system in the time domain are discussed herein.

Figure 8:
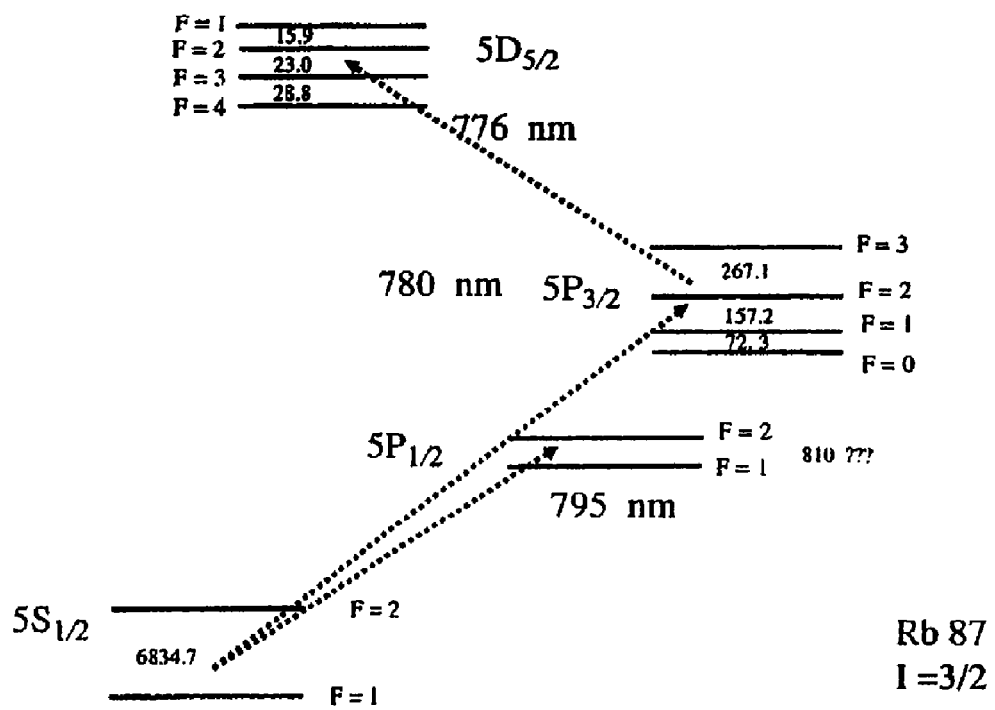
FIG. 8 depicts the energy levels of $^{87}$Rb with hyperfine splitting values in MHz.

A theory of coherent interaction with a pulse train is provided in the following without limiting the embodiments of the present invention. FIG. 8 depicts the energy levels of $^{87}$Rb with hyperfine splitting values in MHz. For a ps laser source tuned to D1 transition in $^{87}$Rb, the density matrix equation can be reduced to that of a three level system: here levels 1 and 2 are ground state levels with 6834.7 GHz splitting and level 3 is the upper state. The density matrix rate equation in the interaction picture is:

$$\frac{d\rho_{33}}{dt} = i\frac{\rho_{31}}{\hbar}E\tilde{\rho}^*_{31} + i\frac{\rho_{32}}{\hbar}E\tilde{\rho}^*_{32} - \Gamma_3\tilde{\rho}_{33} + c.c. \quad (1)$$

$$\frac{d\rho_{22}}{dt} = i\frac{\rho_{32}}{\hbar}E^*\tilde{\rho}_{32} - i\frac{\rho_{32}}{\hbar}E\tilde{\rho}^*_{32} + \frac{\Gamma_3}{2}\tilde{\rho}_{33}$$

$$\frac{d\rho_{11}}{dt} = i\frac{\rho_{31}}{\hbar}E\tilde{\rho}^*_{31} - i\frac{\rho_{31}}{\hbar}E\tilde{\rho}^*_{31} + \frac{\Gamma_3}{2}\tilde{\rho}_{33}$$

$$\frac{d\rho_{32}}{dt} = -i\omega_{32}\tilde{\rho}_{32} - i\frac{\rho_{32}}{\hbar}E(\tilde{\rho}_{33} - \tilde{\rho}_{22}) + -i\frac{\rho_{31}}{\hbar}E\tilde{\rho}^*_{21} - \Gamma_{32}\tilde{\rho}_{32}$$

$$\frac{d\rho_{31}}{dt} = -i\omega_{31}\tilde{\rho}_{31} - i\frac{\rho_{31}}{\hbar}E(\tilde{\rho}_{33} - \tilde{\rho}_{11}) + i\frac{\rho_{32}}{\hbar}E\tilde{\rho}_{21} - \Gamma_{31}\tilde{\rho}_{31}$$

$$\frac{d\rho_{21}}{dt} = -i\omega_{21}\tilde{\rho}_{21} + i\frac{\rho_{32}}{\hbar}E^*\tilde{\rho}_{31} - i\frac{\rho_{31}}{\hbar}E\tilde{\rho}^*_{32} - \Gamma_{21}\tilde{\rho}_{21}.$$

$\sigma_{3j}$ is the electric dipole moment between the levels 3 and j, equal in this case to $4.2\times10^{-29}$ cm. The upper level fluorescence lifetime is 27 ns giving $\Gamma_3=(2\pi/27)\,10^9\,s^{-1}$. The values of $\Gamma_{13}$ and $\Gamma_{23}$, decay rates between the upper level and each ground state, are set to half of this value. $\Gamma_{12}$ coherent decay rate of the two lower states is 293 kHz, due to transit time broadening for Rb in room temperature for a beam size of 1 mm.

The difference in frequency between levels i and j is $\omega_{ij}=\omega_i-\omega_j$ (see FIG. 8). The electric field is $$E = \frac{1}{2}\tilde{\varepsilon}(t)e^{i\omega t}, \quad (2)$$

where t is the time and $\omega$ is the light frequency. $\tilde{\epsilon}$ is a complex electric field amplitude, which entails the eventual chirp of the pulse. The pulse train picture in time can be represented by pulse envelopes (for example a Gaussian pulse with the full width at half maximum (FWHM) of $\tau_p=1$ ps) separated in time with pulse period $\tau_{RT}$, which creates a phase shift $\omega t$ from pulse to pulse. This can mathematically be stated as:

$$E = \sum_{k=0}^{N-1} \tilde{\varepsilon}(t - k\tau_{RT})e^{i\omega(t - k\tau_{RT})} \quad (3)$$

$$= e^{i\omega t}\sum_{k=0}^{N-1} \tilde{\varepsilon}(t - k\tau_{RT})e^{i\phi_k},$$

where $\phi_k$ describes the phase relation between pulses.

After substitution of the electric field equations (2) or (3) into the system of Eq. (1) and taking similarly $\rho_{13}$ and $\rho_{23}$, off diagonal matrix elements, in a frame rotating with optical frequency $\omega$, one can find a system of differential equations for the amplitude of the fields. This system of differential equations can be solved using the Butcher predictor-corrector method, which has been found to be most stable for solving Schrödinger type equations. It has been verified that the elements of the density matrix converge towards a steady-state value after a sufficient number of pulses. A result of the density matrix element has been obtained after interacting with 900 pulses.

The pulse envelope is chosen to be the Gaussian $\epsilon=\epsilon_0 \exp[-(t/\tau_G)^2]$, with a duration $\tau_p=\tau_G\sqrt{(2\ln 2)}=1$ ps for most calculations, although the result has been tested for $\tau_p=100$ fs and 10 ps. The time integral of the Rabi frequency area=$\int(\rho_{ij}E/\hbar)\,dt$ over a single pulse of the train is the pulse area, a parameter that defines how hard the transition is driven.

Figure 9:
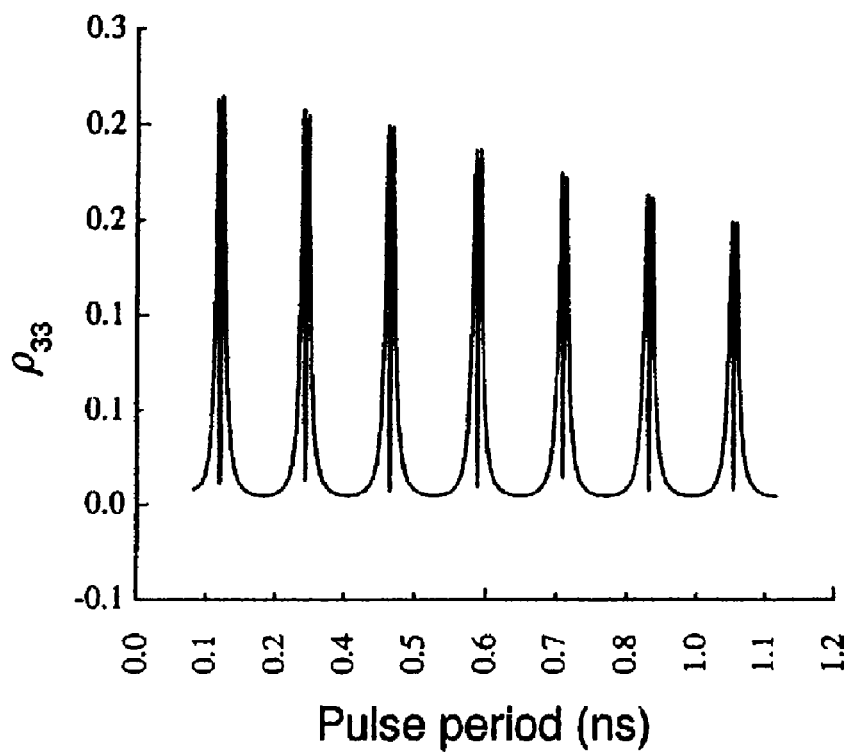
FIG. 9 shows a series of dark lines, as the repetition rate of the pulses is being scanned for area 0.1.

FIG. 9 shows a series of dark lines, as the repetition rate of the pulses is being scanned for area 0.1. The diagonal element $\rho_{33}$, proportional to the fluorescence induced by the pulses, is plotted as a function of the repetition rate (a function of pulse period). The dark line is a coherence feature observed when the repetition rate of the pulse train equals a submultiple of the hyperfine splitting. The first dip corresponds to the case where repetition rate is 6834.7 GHz, which is the hyperfine splitting in the ground state. The other dips are for ½, ⅓, and higher fractions of this value.

Figure 10:
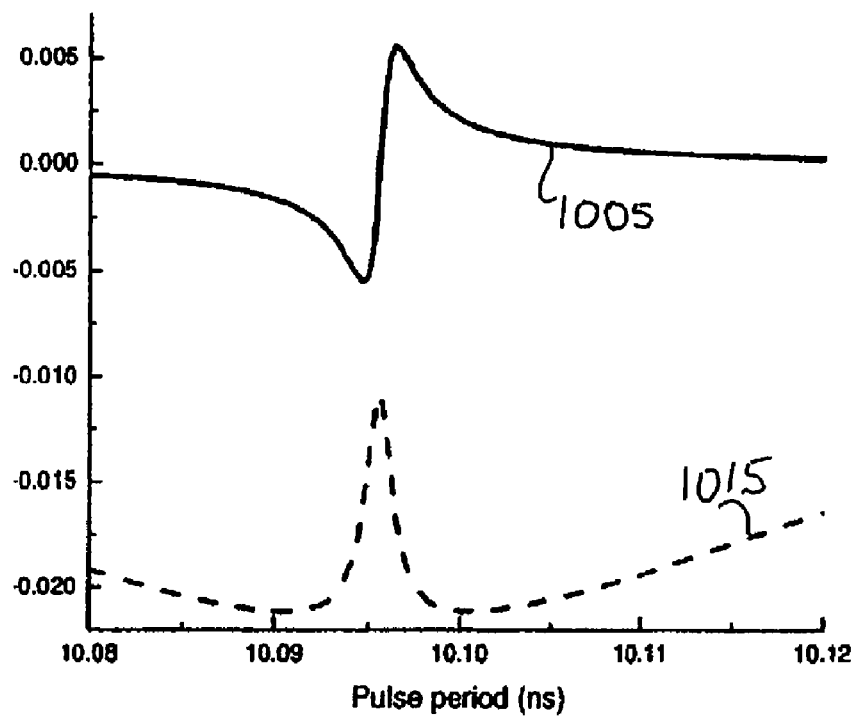
FIG. 10 shows plots of the real and imaginary part of off diagonal density matrix element $\rho_{31}$ as function of pulse period.

FIG. 10 shows plots of the real part 1005 and imaginary 1015 part of off diagonal density matrix element $\tau_{13}$ as function of pulse period. FIG. 10 shows a reduction in absolute value of the imaginary part 1015, when the repetition rate reaches the resonance value. The reduction in absolute value of the imaginary part 1015 of $\rho_{13}$ corresponds to the dark line phenomena when the repetition rate is 1/69 of hyperfine splitting and the area is 0.1. The real part 1005 of $\tau_{31}$ is a dispersion curve associated to its conjugate. The repetition rate may be chosen to be around the 69th submultiple of the hyperfine splitting, to be closer to practical values of the laser cavity length. The off-diagonal density matrix element $\tau_{13}$ couples the ground state 1 to the upper state 3. A graph for $\tau_{32}$ would show similar behavior.

Figure 11:
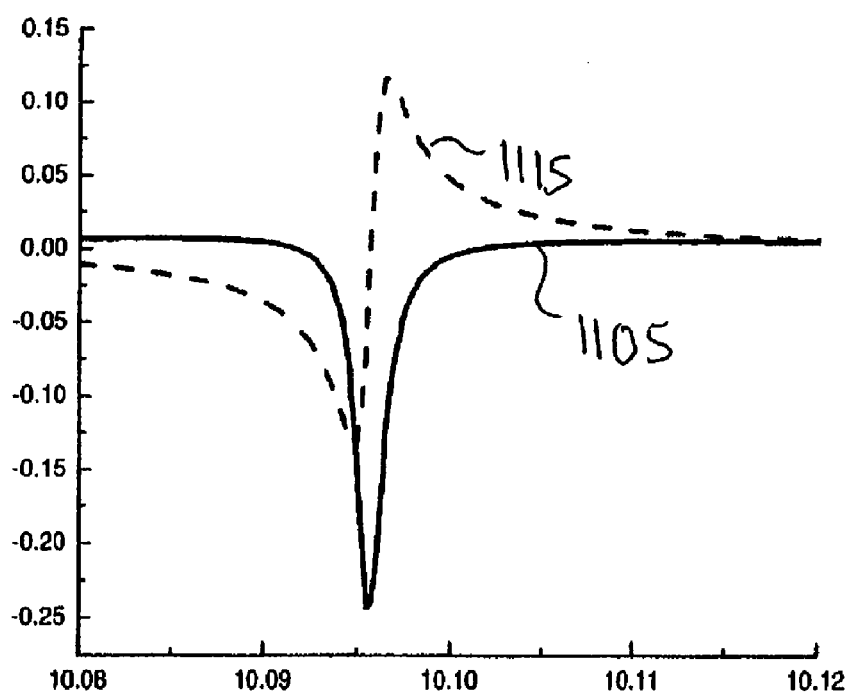
FIG. 11 shows plots of the real and imaginary part of the off diagonal density matrix element $\rho_{21}$ as a function of pulse period.

FIG. 11 shows plots of the real part 1105 and imaginary part 1115 of the off diagonal density matrix element $\tau_{12}$ as a function of pulse period. The increase in absolute value of the real part 1105 of $P_{12}$ corresponds to the trapping of population between the two ground states, when the repetition rate is changed around a 1/69 of the hyperfine splitting between levels 1 and 2 and the area is 0.1. This is a resonant condition similar to that of $\tau_{31}$. The $\tau_{12}$, relating the two ground states, is an indicator of coupling between them. The real part 1105 of $P_{12}$ encounters an increase in absolute value at the resonance repetition rate that suggests the trapping of population between the two states. The imaginary part 1115 of $\rho_{12}$ is the Kramers-Krönig correspondent of the real part 1105 of the density matrix element. The width of this dip is about 15 kHz, corresponds to a transit time broadening of 293 kHz for a 1 mm diameter beam.

The sensitivity of the dark line shape to mode frequency has been numerically investigated. For optical frequencies $\omega=\omega_{res}+\delta$, where $\delta$ can be any value from 0 to 1 GHz, the height and width of the dark line ($\rho_{33}$ as a function of repetition rate) remains unchanged. This property shows that Doppler broadening does not, to first order, affect the dark line feature.

The jitter added in FIG. 4 is a random change of frequency after each 40 pulse of 900 pulses. It is clear that the dark line width and amplitude is independent of the mode frequency jitter. FIG. 4 illustrates another confirmation of the robustness of the dark line, where the fluorescence of the dark line (or $\tau_{33}$) is plotted as a function of repetition rate for a randomly fluctuating carrier frequency. To simulate statistical motion of cavity elements, the carrier frequency $\omega$ is given an increment $\Delta$ after every 40 pulses $\omega=\omega_{res}+\Delta$, where $|\Delta|$ takes the random value up to 2 MHz (401) and 10 MHz (402) in FIG. 4. The result shows the depth and width of the dark line to be independent of mode frequency shift or of the fluctuation in the value of the mode frequency. Therefore there is essentially no need for mode and offset frequency stabilization in the dark line measurement.

The power broadening for the resonance feature corresponds to the case that repetition rate matches substantially the exact hyperfine splitting may be observed in FIG. 5. The shape of the dark line is very sensitive to the laser power, as illustrated by the successive plots in FIG. 5. The curves are labelled by the value of the area, time integral of the Rabi frequency for an individual pulse. The repetition rate is chosen to be close to the hyperfine splitting, to study the dependence of the first of the dark line series in FIG. 9, on optical power. The laser pulse duration is set to 1 ps. For areas below 0.01, the dark line is only a small perturbation on a weak fluorescence. For the area between 0.01 and 0.1, the dark line has a narrow width. As the area increase above 0.5, the broadening of the dark line can be seen in the picture, leading to complete extinction of the dark line feature for an area equal to 2. The result of the power broadening calculation in FIG. 5 may be used as an aid to select the appropriate beam size and power for optimum observation of the dark line.

The following considers dark line measurement with ps pulse train. The use of the two photon transition (to the $5D_{5/2}$ level in FIG. 9) in counter propagating geometry, for two photon dark line spectroscopy at 778 nm, has been investigated. The interference between two pathways coupling the ground states (direct Raman coupling or coupling via the two-photon resonant transition) made the physical situation complex. Meanwhile, the dark line study with continuous source shows that the D1 transition of Rb is a better candidate than the D2 transition, since Clebsch-Gordan (C-G) coefficients are equal for both hyperfine levels of the upper state.

Since there is an optimal pulse area, it is desirable to use longer pulses than the 100 fs pulses that a Ti Sapphire typically generates. For a given power density, longer pulses corresponds to larger areas. Therefore, a longer pulse allows the use of a broader beam, hence a smaller transit time broadening. On the other hand, the pulse width should be short enough for both ground state transitions to keep them on resonance, and long enough to cover only one transition line to the single upper level. A system may be arranged to operate with 1 ps pulses, of which spectrum covers both the hyperfine splitting and the 500 MHz Doppler width.

The laser source used may be Ti:Sapphire pumped by a doubled Nd Vanadate laser (Coherent Verdi-5W). Mode locking and spectrum control may be achieved through appropriate design of multiple quantum wells in reflection. A 4.6 mm quartz birefringent filter may be used to enable fine tuning of the pulse frequency, and a restriction of the pulse bandwidth (central frequency 795 mm and bandwidth 2 nm).

Figure 12:
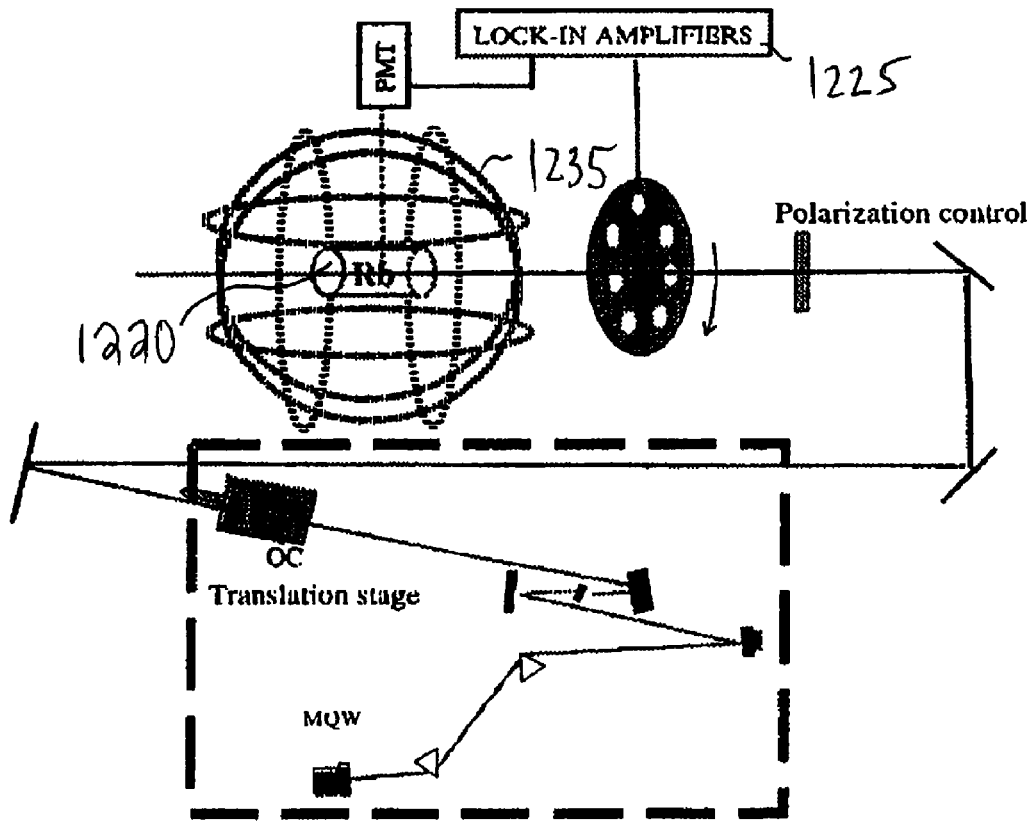
FIG. 12 shows a laser pulse train sent to a Rb cell.

FIG. 12 shows a laser pulse train sent to a Rb cell 1220. The chopped fluorescence signal from the side of the cell is detected by a slow lock-in amplifier 1225 and recorded in a computer. In such an arrangement, in view of the result of simulation, electronic stabilization can be bypassed. The output of the mode-locked laser is sent to the $^{87}$Rb cell 1220 at room temperature. The chopped fluorescence signal from the side of the cell is detected with locking amplifier 1225. The signal at chopped frequency is sent to the computer, where a lab view program records simultaneously the repetition rate of the laser and the fluorescence. The repetition rate is scanned by translating the output coupler and monitored by a frequency counter synchronized to a 10 MHz calibration signal of a Novatech Rb frequency standard. The earth magnetic field is suppressed with Helmholtz coils 1235 in order to keep the hyperfine levels magnetically degenerate. The proper choice of quarter waveplate (QWP) and half wave plate is for polarization dependence studies.

Figure 13:
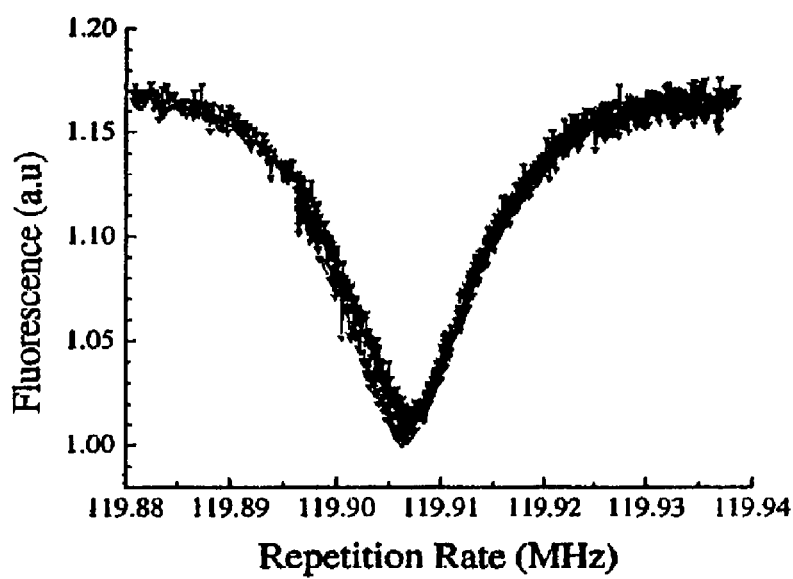
FIG. 13 shows measurement of fluorescence as function of repetition rate.

FIG. 13 shows measurement of fluorescence as function of repetition rate. The dip in fluorescence corresponds to the repetition rate equal to 1/57 of hyperfine splitting. The width of the dark line is 11 kHz, corresponding to 1/57th of the transit time broadening of a 2.3 mm diameter of a Gaussian beam with area 0.23.

The dark line resonance of rubidium has been studied both experimentally and theoretically for mode-locked laser excitation. It has been demonstrated experimentally and theoretically that the resonance width is insensitive to fluctuations in optical frequency. In various embodiments, high resolution spectroscopy may be conducted by which only the repetition rate (cavity length) is being scanned. The spectral features are independent of the exact mode frequency, which fluctuates as the repetition rate is being scanned. With this insensitivity to optical frequency, this resonance may be applied to a variety of applications to stabilize the repetition rate of a frequency comb.

Spectroscopy has traditionally used the laser as a delta-function frequency source, tunable across the spectrum, to probe mainly the absorptive properties of material placed outside of that source. Various embodiments may provide intracavity spectroscopy with mode-locked lasers. A laser may be used as a source of one or more frequency combs, to probe the dispersive properties of matter inside the laser cavity. By tuning the repetition rate of an ultrashort pulse laser, resonances that are even narrower than the single mode bandwidth may be observed. Such spectroscopy may have applications in biology, where stiff bilayer structures, such as lipid membranes, could be excited at a subharmonic of the laser repetition rate.

When evolving from traditional spectroscopy, where the source tends towards a δ-function in frequency, to time resolved spectroscopy with femtosecond pulses, one has to walk a tight rope between achieving temporal or spectral resolution. With the stabilization of the mode-combs, it appeared feasible to combine high spectral resolution with temporal resolution. Simulation studies and experiments of coherent excitation of two-photon transitions in rubidium with stabilized trains of femtosecond to picosecond pulses may be conducted. One should recognize the extreme difficulty in controlling simultaneously the shape and position of the single pulse spectrum, the position of one single mode, and the mode spacing. Typically, orthogonality of the controls is nearly impossible. By using a linear combination of controls, orthogonality of the repetition rate and single mode, but not the spectral envelope, may be achieved. However, orthogonality of the repetition rate and single mode and the spectral envelope is used for two-photon spectroscopy of rubidium transitions. There are, however, some spectral properties that are, to first order, independent of the mode position, but only repetition rate dependent. The "dark line" resonance is one of them. Another example where the repetition rate scanning may provide sharp resonances is in the study of collective vibration modes, such as the compression resonance of lipid membranes in biology. In both of these examples, the laser repetition rate is a submultiple of the feature to be analyzed, resulting in a narrowing of the observed structures.

Figure 14:
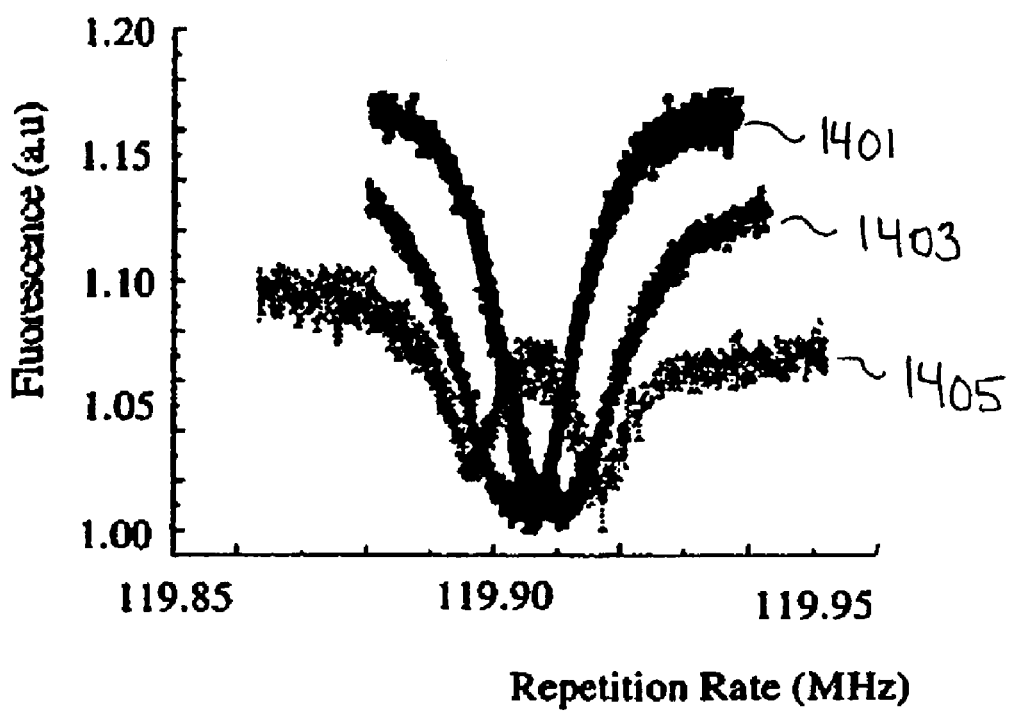
FIG. 14 illustrates Zeeman splitting due to the magnetic field.

Dark line resonances had been observed traditionally with two phase locked narrow line continuous wave (cw) lasers. Simulations of coherent interaction show the coherent interaction with mode locked laser that results in a dark line in Rb fluorescence, when the hyperfine splitting is a submultiple of laser repetition rate and the laser frequency is on resonance with the D1 (795 nm) line. FIGS. 13 and 14 show a recording of the fluorescence of rubidium (rubidium vapor at room temperature with no buffer gas) versus laser repetition rate. The laser is mode-locked with multiple quantum wells. FIG. 13 indicates that the FWHM of the dark line is 11 kHz in the absence of the magnetic field. FIG. 14 illustrates Zeeman splitting due to the magnetic field. Curve 1401 is the fluorescence with no magnetic field. Curve 1403 is the fluorescence with a 240 mG magnetic field. Curve 1405 is the fluorescence with a 420 mG magnetic field.

Figure 15:
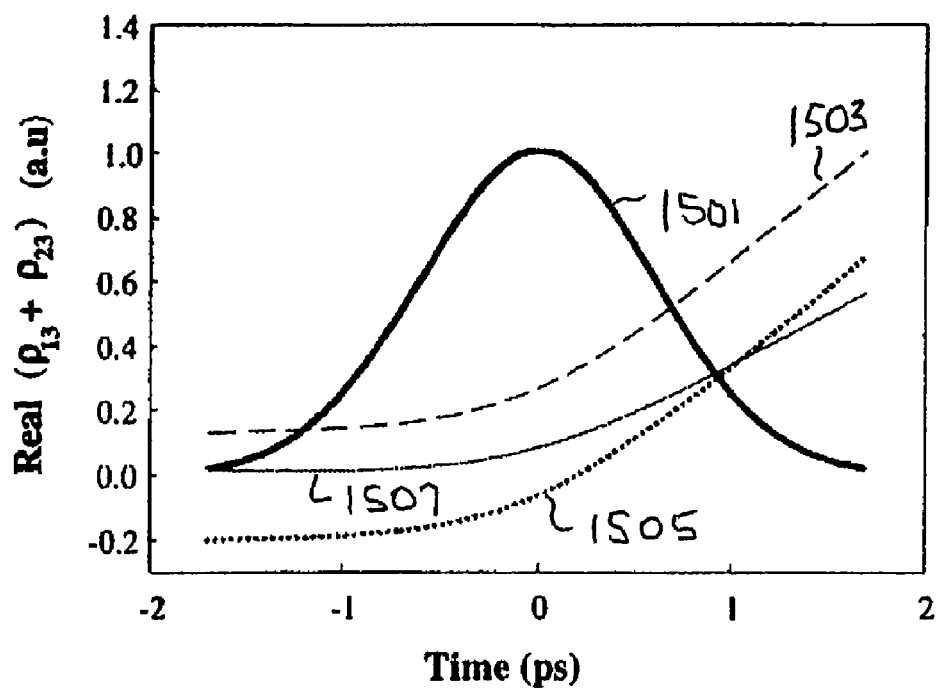
FIG. 15 shows the real part of the polarization plotted as a function of repetition rate for three values of the repetition rate.

A numerical integration code of the interaction equations for an infinite train of pulses may be constructed. The real part of the polarization is plotted as a function of repetition rate in FIG. 15, for three values of the repetition rate. Curve 1501 is for the initial pulse (normalized). Curve 1503 is for a 10.0991 ns pulse. Curve 1505 is for a 10.0919 ns pulse. Curve 1507 is for a 10.09557 ns pulse (resonance). As expected, the index of refraction is antisymmetric with respect to the resonance. For consideration of an intracavity application, only the real part of the polarization is relevant, since the absorption corresponding to the imaginary part will be compensated by the gain medium. It may be noted that for the values of the repetition rate below resonance, the contribution of the resonant polarization is negative, corresponding to an acceleration of the light, while there is a decrease in light velocity at higher repetition rates. This result is consistent with the observation of slow light.

The standard approach to stabilizing the repetition rate of a laser, is to compare it to an electronic standard or an optical standard, to amplify electronically the error signal, and apply it to a piezo-element driving a cavity mirror. Electronic stabilization of a mode-locked laser has been studied. In addition, electronic feedback into a laser has been used to stabilize the laser to the atomic transition of rubidium (hyperfine splitting in Rb) in an application as a time standard.

In an embodiment, an approach to stabilization includes inserting in the laser cavity an element with a strong dependence of group velocity on repetition rate. When the pulse repetition rate increases, the group velocity in that medium decreases, resulting in a decrease of the pulse repetition rate. Resonantly enhanced refractive index in atomic vapors via atomic coherence may make it possible to stabilize the laser repetition rate in a purely optical fashion, without electronics. Electronic noise in feedback loops is eliminated in the purely passive optical system for a variety of embodiments. The conditions that may be satisfied in various embodiments include a proper gain in the feedback loop (i.e. a proper change in group velocity for a small change in repetition rate), an error signal independent of the optical frequency, a correction that does not distort the intracavity pulse, fast dynamics (minimum delay between the detection of an error and its correction), and a correction that does not affect the laser operation.

Figure 16:
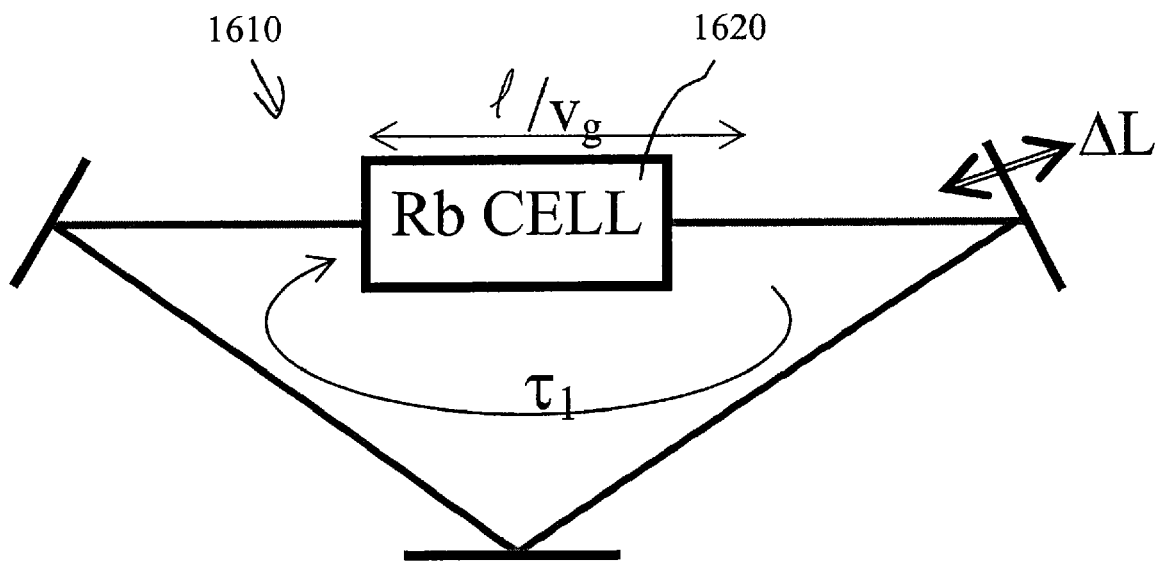
FIG. 16 illustrates a laser cavity including a rubidium cell.

FIG. 16 illustrates a laser cavity 1610 including a rubidium cell 1620. FIG. 2A may be used to illustrate a "dark line" resonance seen as a minimum in absorption, as a function of repetition rate. FIG. 3A may be used to illustrate a group delay, hence the cavity round-trip time, increases with repetition rate, counteracting the eventual decrease due to an increased cavity length.

The use of three level (two split ground states connected to a common upper state) resonant coherent interaction inside a mode-locked laser cavity can provide the feedback. As the spectral envelope covers the two optical transitions, and the repetition rate is tuned to resonance with the ground-state hyperfine splitting, a narrow dip (or peak) in absorption and fluorescence ("dark line") can be observed. Since the establishment of coherence between the split ground states is insensitive to the exact carrier frequency, which may be confirmed theoretically and experimentally using a fs Ti:sapphire laser, the provided error signal is an error signal independent of the optical frequency. The "giant index of refraction" associated with the resonance provides the abovementioned feedback with gain required. The absence of any electronics provides the fastest possible feedback.

A simplified analytical approach may be used for the laser response to the dark line resonance to study the nonlinear Fabry-Perot. The circulation time, $\tau_{RT}$, of the pulse through the ring is the sum of the propagation time, $l/v_g$, through the Rb cell and the propagation time, $\tau_1$, through the rest of the cavity. Through the coherent resonant coupling, the group velocity, $v_g$, in rubidium is itself a function of the repetition rate. One has to solve a self-consistent equation, which, in the case of a Lorentzian model, leads to a third order algebraic equation for the repetition rate. The root of this equation as a function of $\tau_1$ provides the response of the "close loop." Such a simplified model lets one identify the optimal parameters (pressure, magnetic fields, temperature, and buffer gas) for stabilization, as well as the conditions of bi-stability and oscillations. Numerical codes can be used to simulate the coherent response of the atomic system to the train of pulses, which may be used in a study of the laser self-stabilization.

A Ti:sapphire laser has been stabilized in carrier frequency and repetition rate. A technique in which the laser is locked to an ultra-low expansion quartz cavity provides a rapid stabilization, as compared to stabilization to an atomic vapor, but not long term accuracy. A hybrid stabilization may include use of a reference cavity for short term stability and an atomic vapor for accuracy. Using fluorescence of rubidium upon irradiation by a train of pulses in condition of two-photon resonance, the pulse duration is taken to be longer than 1 ps, in order to avoid a cascade excitation via the single s-p photon resonance. Three experimental parameters associated with such configurations include the individual modes of the laser, the repetition rate of the mode-locked laser, and the spectral envelope of the laser (spectral bandwidth and central frequency).

Most work on femtosecond comb has focused on ultrashort (10 to 50 fs) femtosecond pulses, for which the bandwidth is so broad that the spectral envelope is totally irrelevant. In these projects related to the establishment of links between frequency standards, there are only two parameters to control, which may provide a challenge. Controlling simultaneously the three parameters (the individual modes of the laser, the repetition rate of the mode-locked laser, and the spectral envelope of the laser) is a daunting task for pulses longer than 100 fs. It is noted, in attempting to control simultaneously the three parameters, that a Kerr-lens mode-locking is not a reliable mechanism for longer pulses, that multiple quantum wells are effective saturable absorbers for mode-locking, provided the composition of the quantum well is adjusted to the desired wavelength, and that the pulse duration can be controlled by a single birefringent filter, which allows also for a tunability of the mode-locked train in a limited range.

In various embodiments, synchronously pumped OPO configurations may be used for independent, orthogonal control of all parameters including repetition rate, carrier frequency, and pulse spectral envelope. Analysis of coherent interaction with rubidium indicate a resonant enhancement of the fluorescence, where the carrier frequency is resonant with the two-photon transition and the repetition rate is simultaneously resonant with the ground state splitting in situations where a direct Raman coupling between the split ground states is neglected. No resonance may be identified when such Raman transition is taken into account. However, the study of the single photon transition has demonstrated that the dark line resonance can provide an absolute error signal for the repetition rate, independently of the carrier frequency.

Application of the high rate of accuracy and stability that can be achieved in mode-locked lasers may be utilized in a mode of communication at a bit rate in excess of 10 THz. In addition, stabilization of mode-locked lasers may be used in a variety of sensor systems. Sensors may be realized having the absence of a dead band leads for methods to measure backscattering of near perfect optical surfaces (intensity backscattering coefficient as small as $10^{-15}$). In various embodiments, an intracavity pumped ring OPO with a beat note bandwidth of 1 Hz may be used.

A dark line resonance of a material may be observed when the laser repetition rate is a sub-multiple of hyperfine splitting. In various embodiments, application of this feature may be used inside the laser cavity to provide stabilization without any electronic feedback. The dispersion curve of the dark line acts as a purely optical feedback. The slope of this error signal can be adjusted by the number of atoms in the cell, which may be realized by adjusting the cell temperature. Although this auto-stabilization is realized with the D1 transition in Rb(87), it is not limited to this particular atomic vapor cell, and can be applied to materials with a level structure exhibiting a "lambda" shaped resonance.

Figure 17:
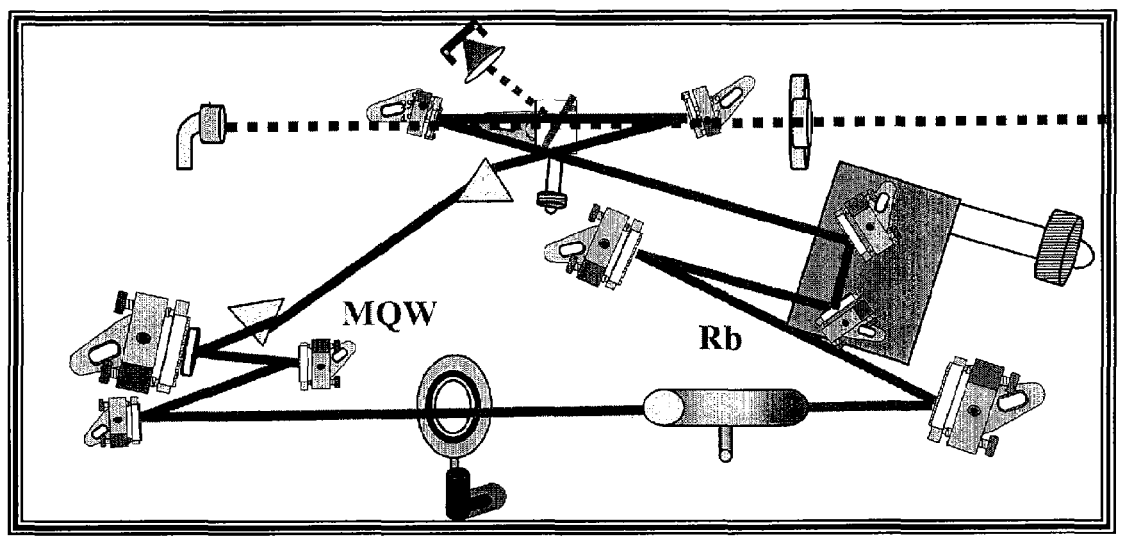
FIG. 17 illustrates an example setup demonstrating optical auto-stabilization.

FIG. 17 illustrates an example setup demonstrating the auto-stabilization. A ring mode-locked picosecond laser is used in this set-up. Mode locking is achieved with a multiple quantum well (4 stack of saturable absorber centered at 795 nm on a mirror). A 4.6 mm birefringence filter is used to restrict the spectrum to ps pulses and tune the wavelength to 795 nm. The cavity length is adjusted with a nano-translation stage. A 10 cm cell with Brewster cut windows containing isotopically pure Rb(87) cell is a part of the laser cavity. At room temperature, a cavity change in length ΔL is transferred to a change in pulse repetition rate by $$\Delta v_{RT} = -(v_g/L^2_{cav})\Delta L + \Delta v_g/L_{cell},$$

where $L_{cav}$ is the laser cavity length and $v_g$ is the group velocity of light in the cavity. The group velocity itself $v_g$ in the rubidium is affected by the pulse repetition rate. At a higher temperature (64° C. for example), there is a sufficient number of atoms interacting with light pulses in the cavity to cause a change in group velocity $\Delta v_g$ sufficient to nullify the change in repetition rate due to the cavity.

Figure 18:
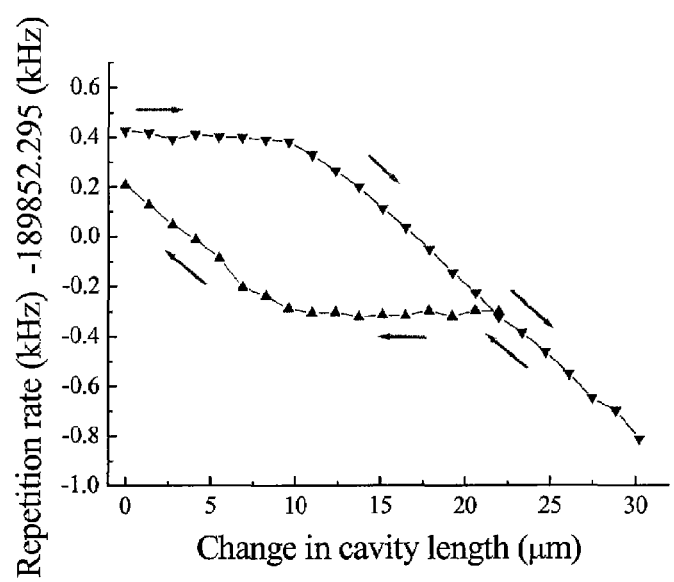
FIG. 18 shows group velocity control by means of atomic interaction.

FIG. 18 shows the group velocity control by means of atomic interaction when the repetition rate is scanned around the 36 submultiple of the Rb hyperfine splitting. The arrows indicate direction of the cavity change. As the cavity length increases towards the 189852.295 kHz (36 submultiple), the repetition rate of the laser stays at constant value. The auto-stabilization range is in the order of 15 μm as seen in FIG. 18. The dispersion of the dark line opposes the group velocity change imposed by the cavity length hence the laser repetition rate stays constant. The other flat region of this curve corresponds to the cavity shrinking. Here again there is 15 μm range when the dispersion of the dark line suppresses the change imposed by the cavity length and keeps the repetition rate constant. The size of this hysteresis curve can be adjusted by temperature of the cell and laser power. This stabilization, as shown in the above example, solely affects the group velocity of the pulse and it is independent of the mode frequency.

Figure 19:
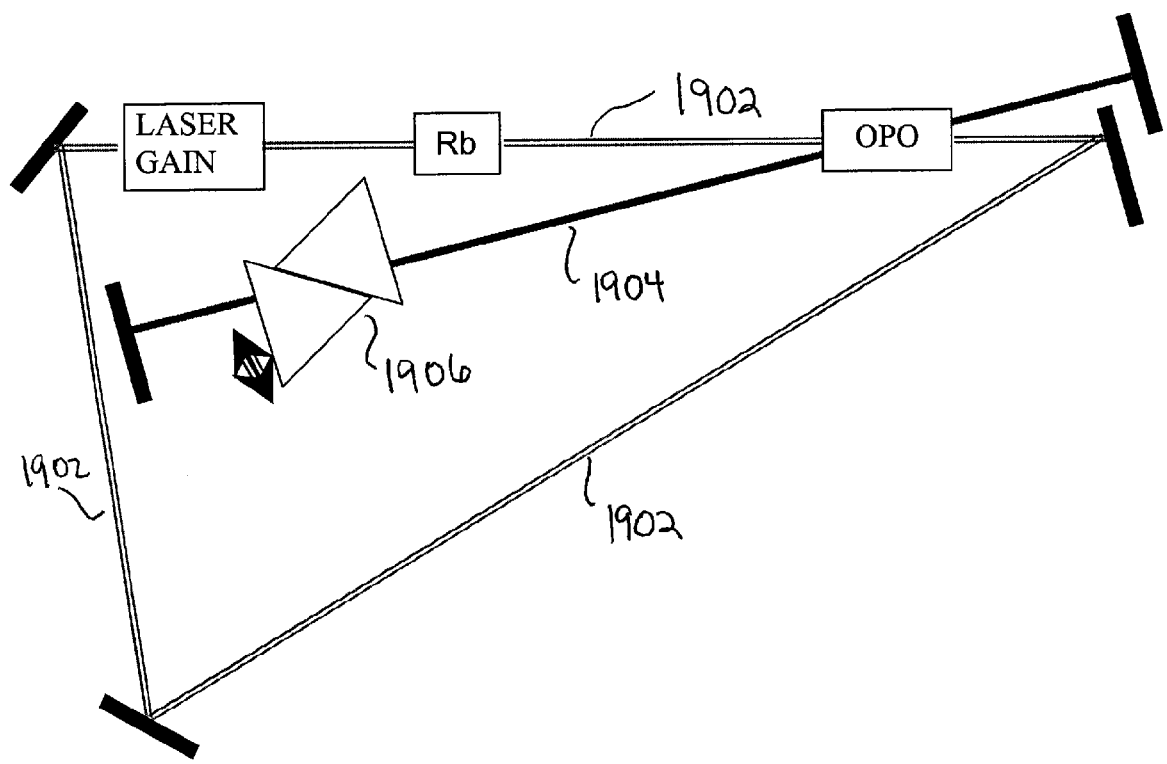
FIG. 19 illustrates a design to provide a purely optical stabilization both in mode frequency and repetition rate.

FIG. 19 shows a design to substantially provide a purely optical stabilization both in mode frequency and repetition rate. This stabilization scheme consists of two entangled cavities. The pump cavity 1902 is a ring laser with Rb cell inside. As demonstrated above, the repetition rate of this cavity is auto-stabilized with Rb dispersion associated to the dark line. The repetition rate of the OPO cavity 1904 is set by the pump. The wavelength of the OPO cavity is taken to be longer than 1.3 micron, which is the wavelength of zero dispersion of glass.

In an embodiment, a laser configuration may include use of a semiconductor laser as a pump. Such a configuration may make the laser operation easier and more efficient. Not only does such a configuration avoid an interminable chain of lasers, but it also provides a gain medium with high gain and short lifetime, similar to the dye laser, with no tendency to Q-switching. Intracavity loss may be reduced by using a non-collinear PPLN configuration, enabling the use of single wavelength coatings of 99.9% reflectivity and enhancing the bandwidth of the parametric conversion. By choosing the signal wavelength to be 1.55 μm, the signal cavity may be aligned with a fiber laser.

Each of the pulse trains emitted by an OPO cavity is characterized by a repetition rate and the optical frequency of a mode. In general, these two parameters are not independent: any correction on one parameter (for instance, the wavelength) affects the other as well (the repetition rate). The situation is different in a synchronously pumped OPO. The repetition rate of the signal is uniquely determined by the repetition rate of the pump. The wavelength (mode frequency) of the "signal" is uniquely determined by the optical length of the signal cavity. The wavelength and exact mode frequency of the OPO signal is independent from that of the signal within the phase matching bandwidth: to any fluctuation in pump carrier frequency will correspond an opposite frequency fluctuation in the idler, which leaves the signal unaffected.

In an embodiment, a configuration is designed to stabilize the repetition rate of the pump cavity to a hyperfine transition of rubidium and to use another atomic standard to stabilize the wavelength (phase velocity control) in the OPO signal cavity. This approach ensures orthogonality, independent controls of the repetition rate and mode frequency.

Figure 20:
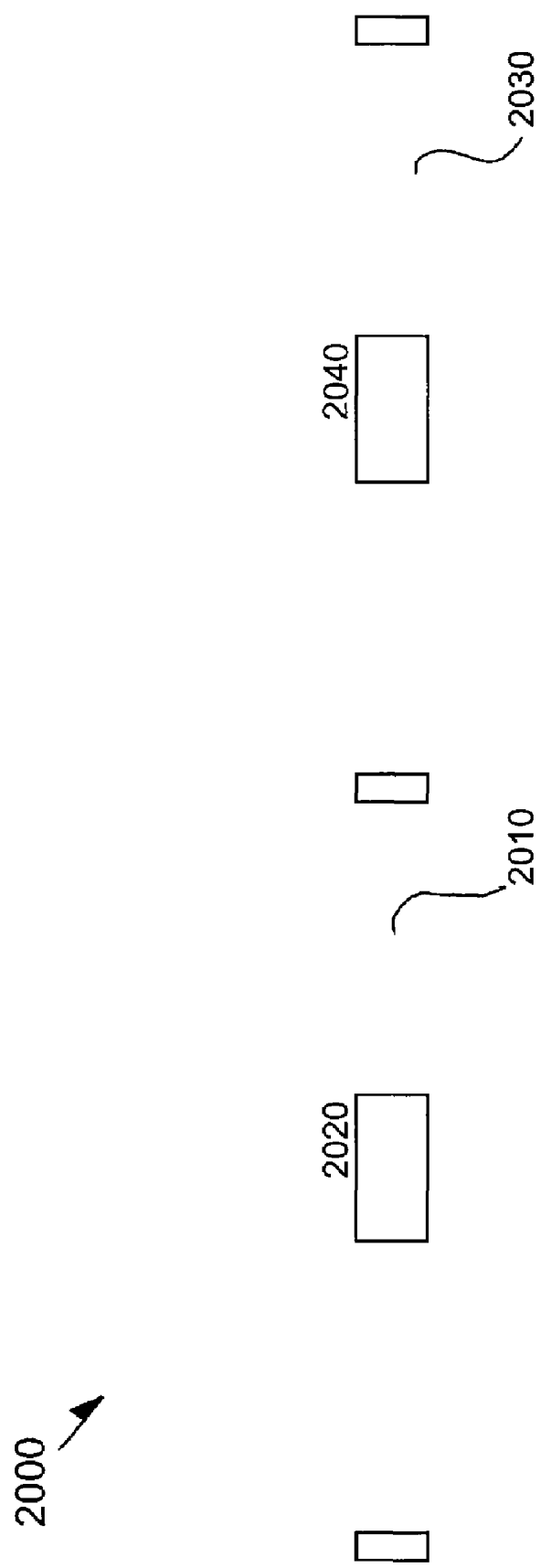
FIG. 20 that shows a laser cavity including a material to stabilize output from the laser cavity with the laser cavity coupled to an external cavity that includes another material that provides another atomic standard

In order to maintain a compact, robust and light instrument, self-stabilization by an atomic vapors for the pump and signal cavities, following embodiments as described above, may be employed. The pump wavelength can be at the 795 nm rubidium resonance and the signal wavelengths near 1.5 µm, for which calcium is a prime candidate as the other atomic standard, with a transition at 1.5 µm of which the ground state can be populated by a semiconductor laser around 650 nm. Various embodiments provide a method to stabilize in time (mode spacing) and wavelength (absolute mode position) a diode laser. Such arrangements may provide considerably more compact and simple instrument than the design involving a combination of a reference cavity for fast feedback and an atomic vapor for accuracy. Consider FIG. 20 that shows an apparatus 2000 having a laser cavity 2010 including a material 2020 to stabilize output from laser cavity 2010 with laser cavity 2010 coupled to an external cavity 2030 that includes another material 2040 that provides another atomic standard. In embodiment, material 2020 may include rubidium and material 2040 may include calcium. Other materials may be used dependent upon the application for the laser system.

For the intracavity pumped OPO ring laser, the conventional alkali atomic vapors are typically ruled out, since the wavelength of the s→p transitions falls below 1 µm. The OPO pumped at 780 nm would operate in the range of 1 to 2 µm. Better transitions for this wavelength range may be found from metastable states of Ca, Yb, or Sr. Calcium is as prime candidate, with a transition at 1.5 µm of which the ground state can be populated by a semiconductor laser around 650 nm. In a configuration, one can use hollow cathode discharge lamps as sample cells. For an enhanced instrument, purely optical excitation may be used to avoid the perturbation of the measurements due to the magnetic fields produced by the discharge lamps.

Any cavity length fluctuation in the OPO cavity results in the shift of the modes and the spectrum of the laser pulse in that cavity. In an embodiment, a novel optical solution for stabilization is provided by the use of a prism pairs 1906 in the cavity 1904 in FIG. 19. In an embodiment, a wavelength near 1.5 micron may be used. Most glasses have negative dispersion around 1.5 microns. By translating the two prisms along each others, one can continuously adjust the thickness of intracavity glass, hence the amount of negative dispersion in that cavity. Consider the following view of the stabilization. If the OPO cavity length increases (noise fluctuation), the wavelength of the OPO signal will also increase. If the wavelength increases, the index of refraction of the glass decreases, resulting in a decrease of optical path. For a sufficient amount of glass/dispersion in the cavity, the decrease in optical path will compensate the increase due to length fluctuation. The use of glass in the above provides a non-limiting example. Other materials may be used in applications at this example wavelength or at other wavelengths. Materials, for instance atomic vapors, with the same property of negative dispersion may be used.

In various embodiments, a purely optical solution (both in mode and repetition rate) with orthogonal error signals for laser cavity stabilization may be realized. Such solutions can provide for construction of a laser that is at the same time a stable, calibrated "clock, that is a time standard, (stable, calibrated repetition rate) and a wavelength standard, without the use of complex electronic stabilization.

In the above detailed description, reference may be made to specific examples by way of drawings and illustrations. It is to be understood that the above description is intended to be illustrative, and not restrictive, and that the phraseology or terminology employed herein is for the purpose of description. Features or limitations of various embodiments described herein do not limit the inventive subject matter as a whole, and any reference to the invention, its elements, operation, and application are not limiting as a whole, but serve only to define these example embodiments. The above detailed description does not, therefore, limit embodiments of the invention.

What is claimed is:

1. An apparatus comprising:
    a mode-locked laser, the mode-locked laser having a laser cavity, the laser cavity having a cavity length; and
    a material disposed inside the laser cavity, the material having an optical length that varies to maintain a constant repetition rate as the cavity length fluctuates, the material having one or more properties to provide optically controlled auto-stabilization of the repetition rate.

2. The apparatus of claim 1, wherein the material has an optical length that decreases as a repetition rate of an optical output of the laser cavity decreases.

3. The apparatus of claim 1, wherein the material has a resonant optical transition at a frequency proportional to the repetition rate.

4. The apparatus of claim 1, wherein the material includes rubidium.

5. The apparatus of claim 1, wherein the material has a structure having at least three levels, to provide resonant coherent interaction, such that one level is separated from the two other levels by an optical transition corresponding to a laser frequency of the mode-locked laser.

6. The apparatus of claim 1, wherein the material disposed in the laser cavity includes atomic vapors.

7. The apparatus of claim 1, wherein the mode-locked laser is configured to mode-lock at about 795 nm with a repetition rate near a submultiple of a hyperfine splitting of a rubidium ground state.

8. The apparatus of claim 1, wherein the apparatus includes another material having a structure to provide wavelength stabilization to an optical output.

9. A system comprising:
    a laser apparatus including a mode-locked laser, the mode-locked laser having a material disposed in a laser cavity of the mode-locked laser, wherein the laser cavity is configured as a ring, the laser cavity having a cavity length, the material having an optical length that varies to maintain a constant repetition rate as the cavity length fluctuates, the material having one or more properties to provide optically controlled auto-stabilization of the repetition rate; and
    a receiver unit to collect an output from the laser apparatus.

10. The system of claim 9, wherein the material has an optical length that decreases as a repetition rate of an optical output of the laser cavity decreases.

11. The system of claim 9, wherein the material has a resonant optical transition proportional to the repetition rate.

12. The system of claim 11, wherein the material includes rubidium.

13. The system of claim 9, wherein the material has a structure having at least a three levels to provide resonant coherent interaction.

14. The system of claim 9, wherein the laser apparatus includes an external cavity configured to hold a test sample.

15. The system of claim 9, wherein the laser apparatus is arranged as a spectroscopic tool.

16. The system of claim 10, wherein the laser apparatus is arranged as a time standard.

17. A method comprising:
generating an optical pulse train from a laser source, the laser source being a mode-locked laser having a laser cavity in which a material is disposed, such that coherence is established between atomic levels of the material to auto-stabilize the pulse train optically, the material having an optical length that varies to maintain a constant repetition rate of the optical pulse train as the cavity length fluctuates; and
directing the optical pulse train to a receiver.

18. The method of claim 17, wherein generating an optical pulse train includes mode-locking the laser source using a multiple quantum well saturable absorber.

19. The method of claim 17, wherein the method includes using rubidium in the laser cavity to auto-stabilize the optical pulse train.

20. The method of claim 19, wherein the method includes using calcium to provide wavelength stabilization to the optical pulse train.

21. The method of claim 17, wherein the method includes using the auto-stabilized optical pulse train as a time standard.

22. The method of claim 17, wherein the method includes:
forming a cavity including the laser source;
irradiating a sample with the optical pulse train; and
analyzing an output provided by the irradiating of the sample.

* * * * *

UNITED STATES PATENT AND TRADEMARK OFFICE
CERTIFICATE OF CORRECTION

PATENT NO. : 7,664,149 B2  Page 1 of 1
APPLICATION NO. : 11/745837
DATED : February 16, 2010
INVENTOR(S) : Jean-Claude Diels et al.

It is certified that error appears in the above-identified patent and that said Letters Patent is hereby corrected as shown below:

In column 15, line 4, in Claim 13, after "least" delete "a".

Signed and Sealed this

Fourth Day of May, 2010

David J. Kappos
*Director of the United States Patent and Trademark Office*